(12) United States Patent
Nishikawa et al.

(10) Patent No.: US 7,920,225 B2
(45) Date of Patent: Apr. 5, 2011

(54) ELECTRONIC APPARATUS WITH PROTECTIVE PANEL

(75) Inventors: Kazuhiro Nishikawa, Uji (JP);
Yoshihiro Kai, Nagaokakyo (JP);
Yuichiro Takai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 360 days.

(21) Appl. No.: 12/278,651

(22) PCT Filed: Feb. 7, 2007

(86) PCT No.: PCT/JP2007/052128
§ 371 (c)(1),
(2), (4) Date: Nov. 3, 2008

(87) PCT Pub. No.: WO2007/091600
PCT Pub. Date: Aug. 16, 2007

(65) Prior Publication Data
US 2010/0053854 A1    Mar. 4, 2010

(30) Foreign Application Priority Data

Feb. 9, 2006   (JP) .................................. 2006-032943

(51) Int. Cl.
G02F 1/1333 (2006.01)
G02F 1/1335 (2006.01)
(52) U.S. Cl. ................ 349/60; 349/11; 349/12; 349/16; 349/17; 349/58
(58) Field of Classification Search .................... 349/11, 349/12, 16, 17, 58–60
See application file for complete search history.

(56) References Cited

U.S. PATENT DOCUMENTS

| 2004/0156168 | A1 | 8/2004 | LeVasseur et al. |
| 2005/0052428 | A1 | 3/2005 | Hayashi et al. |
| 2006/0066772 | A1* | 3/2006 | Takahashi et al. ............. 349/60 |
| 2007/0181456 | A1 | 8/2007 | Kusuda et al. |
| 2007/0273671 | A1* | 11/2007 | Zadesky et al. ............... 345/173 |
| 2008/0246741 | A1* | 10/2008 | Hinata ........................... 345/173 |

FOREIGN PATENT DOCUMENTS

| JP | 4087226 A | 3/1992 |
| JP | 2005242423 A | 9/2005 |
| WO | 2004/072842 A2 | 8/2004 |
| WO | 2004072842 A2 | 8/2004 |
| WO | 2005064451 A1 | 7/2005 |

* cited by examiner

Primary Examiner — Rhonda S Peace
(74) Attorney, Agent, or Firm — The Webb Law Firm

(57) ABSTRACT

An electronic apparatus with a protective panel, includes a display device 3 having a display section 3A, an enclosure 2 having a display window 2A which is open in one direction and mounts therein the display device 3 so as to expose the display section 5A to the outside, a protective panel 4 disposed at the display window 2A so as to cover the display section 3A from the outside; and a pressure-sensitive conductive rubber 14 interposed between a movable portion M including at least the protective panel 4 of the protective panel 4 and the display device 3 and a frame-like support portion 2b defined by a surface of the enclosure 2 within the display window 2A, so as to prevent intrusion of foreign substance to the interior of the enclosure 2 through the display window 2A, the rubber detecting a depressing operation on the movable portion M.

14 Claims, 12 Drawing Sheets

Fig.18
(a)
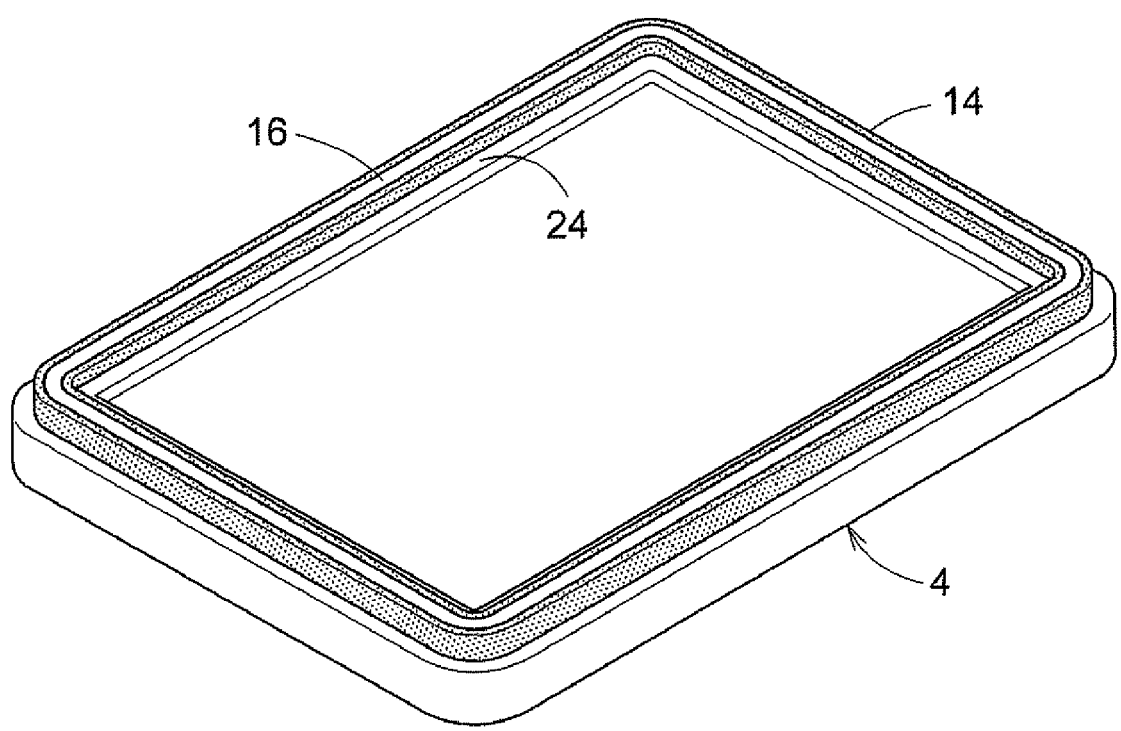
(b)
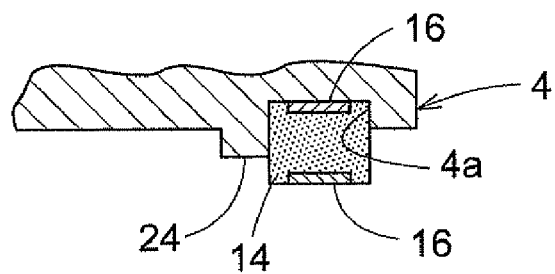

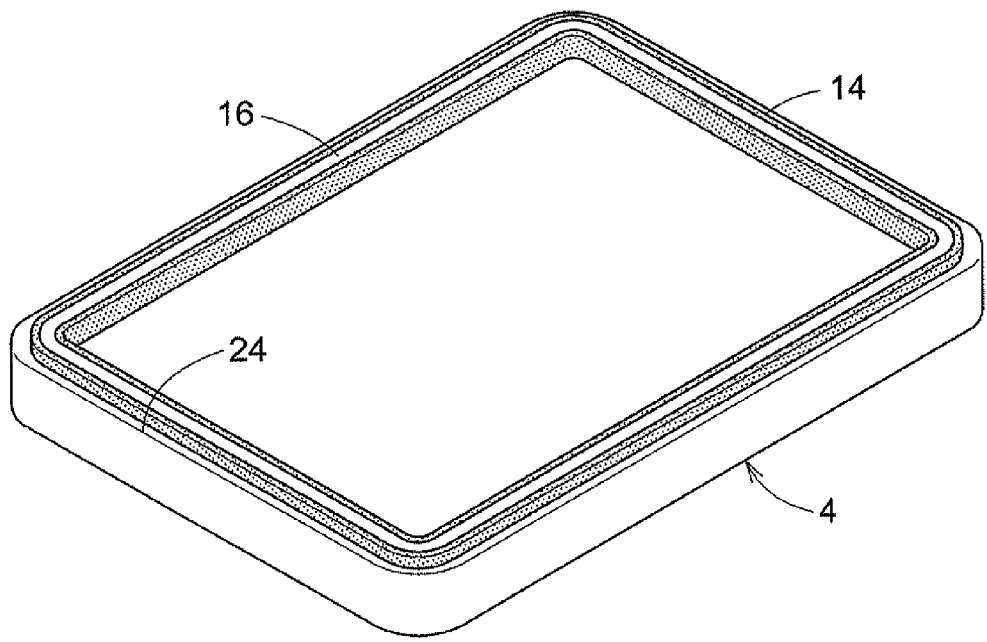
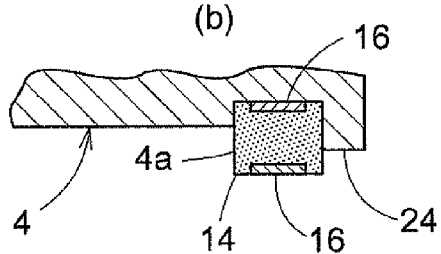
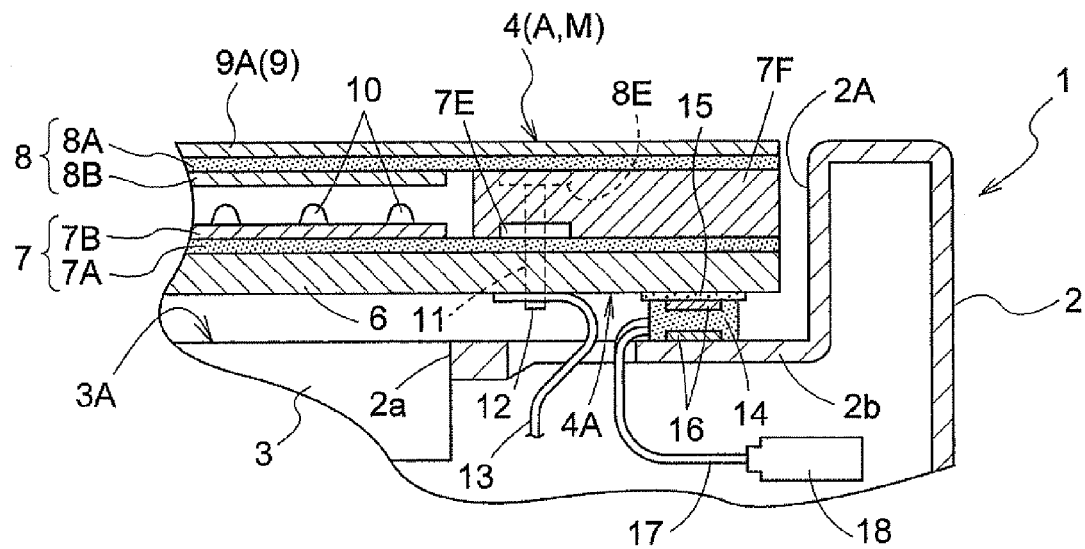

|  | artificial sweat | water |
|---|---|---|
| Embodiment 1 | O | O |
| Embodiment 7 | O | O |
| Embodiment 8 | O | △ (slight intrusion found) |

ELECTRONIC APPARATUS WITH PROTECTIVE PANEL

TECHNICAL FIELD

The present invention relates to an electronic apparatus with a protective panel, wherein an enclosure mounting a display device therein forms a display window for exposing a display section of the display device to the outside, the display window includes a support portion for supporting the protective panel for the display device, with the protective panel being fitted within the display window.

BACKGROUND ART

Conventionally, in the case of an electronic apparatus with a protective panel described above, the enclosure mounting the display device therein forms a recess. In a bottom face of this recess of the enclosure, there is defined an aperture for exposing the display section of the display device to the outside. The protective panel for the display device is fitted within the recess, in such a manner that the peripheral edge portion of the protective panel is supported directly to the peripheral edge of the bottom face of the recess (see, e.g. Patent Document 1).

Patent Document 1: WO2005/064451 (paragraphs 0042 through 0043, FIGS. 3-4).

DISCLOSURE OF THE INVENTION

Problem To Be Solved by Invention

In recent years, some of mobile phones or "smart" phones as an example of an electronic apparatus with a protective panel, are provided with multiple functions, i.e. not only the main telephoning function, but also other functions such as an electronic mailing function, internet function, as well as such additional functions as photographing function and music playing function. In order to achieve such increasing of functions while avoiding enlargement of the electronic apparatus, it is desired that each switch should be configured to serve for multiple of purposes, thereby reducing the total number of switches to be additionally provided.

However, if such multi-purpose configuration of switches goes to extreme, each switch is provided with too many functions, which invites deterioration in the operational ease and efficiency. Further, as there practically exits a limit in the number of the switches provided for achieving the original functions and in the number of the switches additionally provided, further increase in the functions of the electronic apparatus will necessarily invite enlargement of this electronic apparatus.

The object of the present invention is to enable further increase in the functions of the electronic apparatus while avoiding or restricting enlargement of the electronic apparatus or deterioration in the operational ease and efficiency, through effective utilization of the protective panel which is included originally in the electronic apparatus with a protective panel, or to achieve improvement in the operational ease and efficiency while avoiding or restricting enlargement of the electronic apparatus.

Means To Solve Problem

For accomplishing the above-noted object, according to a characterizing construction of an electronic apparatus with a protective panel relating to the present invention, the electronic apparatus comprises:

a display device having a display section;

an enclosure having a display window which is open in one direction and mounts therein said display device so as to expose said display section to the outside;

a protective panel disposed at said display window so as to cover said display section from the outside; and a pressure-sensitive conductive rubber interposed between a movable portion including at least said protective panel of said protective panel and said display device and a frame-like support portion defined by a surface of said enclosure within said display window, so as to prevent intrusion of foreign substance to the interior of said enclosure through said display window, said rubber detecting a depressing operation on said movable portion.

With the above-described characterizing construction, there can be obtained a pressure-sensitive sensor comprised of the protective panel as an operational portion and the pressure-sensitive conductive rubber as a pressure-sensitive element. And, this pressure-sensitive sensor can be used as a switch to which a function of a switch to be newly added to the electronic apparatus or a function of an existing switch included originally in the electronic apparatus is assigned.

Further, if this pressure-sensitive sensor utilizing the movable portion including at least the protective panel is used as a switch corresponding to a function to be newly added to the electronic apparatus, it is possible to eliminate space which would otherwise be required for disposing a switch dedicated to that function. Or, it is possible to avoid assigning that new function to an existing switch, which assignment would be required in case the existing switch is configured to additionally provide that new function. As a result, it becomes possible to enable further increase in the functions of the electronic apparatus while avoiding or restricting enlargement of the electronic apparatus in case space is secured for an additional switch dedicated to a further function or deterioration in the operational readiness and efficiency resulting from causing an existing switch to function as a switch corresponding to a new function.

Further, if this pressure-sensitive sensor utilizing the movable portion is used as a switch to which a function assigned previously to an existing switch is assigned, it is possible to eliminate a space for disposing the switch dedicated to that function, which space would otherwise be required for newly disposing such dedicated switch to which the function is assigned. As a result, it is possible to improve the operational readiness and efficiency, while avoiding or restriction enlargement of the electronic apparatus which would occur otherwise in order to ensure a switch disposing space.

And, the protective panel is provided for the purpose of protecting the display device. Hence, if arrangement is made such that the function of the pressure-sensitive sensor utilizing the movable portion having this protective panel may vary in accordance with displayed contents of the display section, a user can operate the pressure-sensitive sensor without difficulty or confusion, even when such many functions are assigned to this pressure-sensitive sensor.

Moreover, with the pressure-sensitive conductive rubber, it is possible to prevent intrusion of foreign substances such as water, dust, etc. through the display window to the interior of the enclosure, without providing any sealing member dedicated to such purpose, As a result, it is possible to avoid deterioration and short circuit of cable connections or deterioration of the display device or substrate, due to intrusion of such foreign substances through the display window.

Furthermore, if an analog type whose conductivity varies according to the magnitude of external force is employed as the pressure-sensitive conductive rubber, it becomes possible to construct a variable type pressure-sensitive sensor which provides a resistance value variable according to the magnitude of the external force applied to the movable portion. With this, in the case of an electronic apparatus having a photographing function, the pressure-sensitive sensor can be used as a zoom switch for varying the zooming speed according to the magnitude of the external force applied to the movable portion or a shutter switch for varying the shutter speed according to the same. Further, in the case of an electronic apparatus having an image drawing function, the pressure-sensitive sensor can be utilized as a drawing pressure sensor for varying the image density according to the magnitude of the external force applied to the movable portion.

Therefore, by interposing a pressure-sensitive conductive rubber between the movable portion and the support portion, thereby constructing a pressure-sensitive sensor effectively utilizing the protective panel included in that movable portion, it becomes possible not only to achieve further increase in the number of functions of the electronic apparatus while avoiding or restricting enlargement of the electronic apparatus or deterioration in the operational readiness and efficiency, but also to achieve high reliability due to enhanced water-proof performance and dust-proof performances.

According to a further characterizing construction of an electronic apparatus with a protective panel relating to the present invention, the distance between the movable portion and the support portion where the pressure-sensitive conductive rubber is interposed, decreases in response to an increase in the magnitude of a depressing force by the depressing operation.

With the above-described characterizing construction, in accordance with increase of the depressing force by the depressing operation to the movable portion, the pressure-sensitive conductive rubber becomes compressed to provide a correspondingly smaller electric resistance. As a result, when the electric resistance of the pressure-sensitive conductive rubber becomes equal to or smaller than a predetermined threshold value, this can be determined as occurrence of a depressing operation to the movable portion.

According to a still further characterizing construction of an electronic-apparatus with a protective panel relating to the present invention, the distance between the movable portion and the support portion where the pressure-sensitive conductive rubber is interposed, increases in response to an increase in the magnitude of a depressing force by the depressing operation.

With the above-described characterizing construction, in accordance with increase of the depressing force by the depressing operation to the movable portion, the pressure-sensitive conductive rubber becomes expanded to provide a correspondingly greater electric resistance. As a result, when the electric resistance of the pressure-sensitive conductive rubber becomes equal to or greater than a predetermined threshold value, this can be determined as occurrence of a depressing operation to the movable portion.

According to a still further characterizing construction of an electronic apparatus with a protective panel relating to the present invention, one of the movable portion and the support portion which comes into contact with the pressure-sensitive conductive rubber or the pressure-sensitive conductive rubber is configured such that a cross-sectional area thereof normal to an applying direction of the depressing force by the depressing operation varies continuously or stepwise along the applying direction of the depressing force.

In the case of a pressure-sensitive conductive rubber whose cross-sectional area does not vary along the applying direction of the depressing force, e.g. in the case of a pressure-sensitive conductive rubber which is shaped rectangular, the resistance value of the pressure-sensitive conductive rubber will vary sharply from the initial stage of application of the input load, and will hardly vary according to variation in the input load at the final stage of the application of the input load. For this reason, although detection of presence/absence of a depressing operation based on a variation in the resistance value is possible at the initial stage of application of the input load, but the detection is difficult at the final stage of the application of the input load.

On the other hand, according to the above-described characterizing construction, at the initial stage of application of the input load, the contact area between the pressure-sensitive conductive rubber and the support portion or the movable portion of the enclosure is small and then this contact area progressively increases toward the final stage of application of the input load. Therefore, at the initial stage of application of the input load, there occurs no such sharp change in the resistance value of the pressure-sensitive conductive rubber in accordance with variation in the input load. And, at the initial stage of application of the input load too, in association with increase in the contact area, the resistance value of the pressure-sensitive conductive rubber will vary according to variation in the input load. Accordingly, the condition of the depressing force (input load) due to a depressing operation can be determined in a reliable manner, in accordance with variation in the resistance value of the pressure-sensitive conductive rubber from the initial stage to the final stage of application of the input load.

According to a still further characterizing construction of an electronic apparatus with a protective panel relating to the present invention, at a portion of the protective panel to be subjected to a depressing force of a depressing operation, there is provided a reinforcing structure member for enhancing the rigidity of the protective panel.

With the above-described characterizing construction, with the provision of this reinforcing structure member, the rigidity of the protective panel against the depressing operation is enhanced, thus reducing e.g. flexion of the protective panel. As a result, the depressing force due to a depressing operation can be transmitted reliably to the pressure-sensitive conductive rubber, whereby the depressing operation can be detected reliably also.

According to a still further characterizing construction of an electronic apparatus with a protective panel relating to the present invention, the pressure-sensitive conductive rubber is formed like a loop along the support portion.

With the above-described characterizing construction, the pressure-sensitive conductive rubber is to be disposed along the peripheral edge of the back face of the movable portion supported by the support portion. And, when a depressing operation is effected on the protective panel included in the movable portion, regardless of the position of this depressing operation, the pressure to the protective panel will be transmitted to the pressure-sensitive conductive rubber, thereby rendering this pressure-sensitive conductive rubber conductive. Accordingly, the depressing operation to the protective panel can be detected in an even more stable and reliable manner.

Further, with the pressure-sensitive conductive rubber, the gap between the back face peripheral edge of the movable portion and the support portion can be reliably sealed without any interruption. As a result, intrusion of foreign substance through the display window to the interior of the enclosure can be prevented reliably, and deterioration and/or short circuit of the cable connections due to the intrusion of foreign substance through the display window can be avoided in a reliable manner.

Therefore, it is possible to obtain a pressure-sensitive sensor having further improved detection performance, and to enhance also its water-proof performance, dust-proof performance, etc.

According to a still further characterizing construction of an electronic apparatus with a protective panel relating to the present invention, the pressure-sensitive conductive rubber includes a connector extending from an inner wall of the rubber toward the interior of the enclosure.

With the above-described characterizing construction, it becomes possible to provide the wiring to the pressure-sensitive conductive rubber on the inner side (the side of display window) of the pressure-sensitive conductive rubber where intrusion of foreign substance is prevented by the pressure-sensitive conductive rubber. Hence, it becomes possible to avoid the deterioration or short-circuit of cable connections due to intrusion of foreign substance to the wiring portion, without providing any special sealing member dedicated thereto.

Accordingly, it becomes possible to provide the apparatus with further improved water-proof performance and dust-proof performance, without inviting complexity of its construction.

According to a still further characterizing construction of an electronic apparatus with a protective panel relating to the present invention, on one face of the pressure-sensitive conductive rubber, there is mounted a pair of combtooth-like electrodes, via which a depressing operation to the movable portion is detected.

With the above-described characterizing construction, the construction requires provision of the combtooth-like electrodes only on one face of the pressure-sensitive conductive rubber. Hence, this facilitates mounting of the electrodes to the pressure-sensitive conductive rubber. Further, as this construction allows the gap between the pair of electrodes to be small, resistance variation in the pressure-sensitive conductive rubber can be detected with high sensitivity. And, in doing this, there is no necessity of changing the thickness of the pressure-sensitive conductive rubber, so it is possible to ensure a sufficient depressing margin for the depressing operation on the protective panel (movable portion).

According to a still further characterizing construction of an electronic apparatus with a protective panel relating to the present invention, one or both of the movable portion and the support portion defines or define a groove for receiving the pressure-sensitive conductive rubber therein.

With the above-described characterizing construction, it is possible to effect the attachment of the pressure-sensitive conductive rubber at an appropriate position relative to the movable portion or the support portion, in an easy and reliable manner. This allows improvement in the assembly readiness, also prevention of deterioration in the detection performance as well as in the water-proof performance and/or dust-proof performance, due to inadvertent displacement of the pressure-sensitive. conductive rubber from its proper position. The above construction also allows increase in the sealing condition between the movable portion or the support portion and the pressure-sensitive conductive rubber, which increase further improves the water-proof and dust-proof performances.

Accordingly, it becomes possible to increase the reliability with ensuring the superior detection performance as well as the water-proof performance and dust-proof performance, while improving the assembly readiness also.

According to a still further characterizing construction of an electronic apparatus with a protective panel relating to the present invention, said protective panel is configured to provide functions as a touch panel.

With the above-described characterizing construction, it becomes possible to obtain a pressure-sensitive sensor with a touch-panel function, utilizing a protective panel, capable of detecting a depressing operation to the protective panel and detecting also the position of the depressing operation on the protective panel. And, the sensor can be used as a multiple-function switch capable of providing a great variety of complicated functions or a tablet with a drawing pressure detecting function, through combinations of the pressure information and the position information.

And, in case the panel is used as a multiple-function switch, the panel can be configured such that the relationship between the depressing operation position and the function corresponding thereto may be displayed at a displaying area of the display section corresponding to that depressing operation position. With this, an operation corresponding to a function can be carried out without difficulty or confusion.

Incidentally, referring to some possible examples of using as a multiple-function switch, in the case of an electronic apparatus having a photographing function for example, the construction can be adapted to function as a zoom switch or a shutter switch, in accordance with a depressing operation position on the protective panel. In the case of an electronic apparatus having a navigating function, it can be adapted to function as a destination registering switch which determines a destination according to the depressing operation position on the protective panel and then determines presence/absence of registration of the location based on the depressing force applied at that depressing operation position.

Therefore, with the provision of the touch panel function to the protective panel, the pressure-sensitive sensor utilizing the movable portion including this protective panel can, by itself, be configured to provide a greater number of functions. With this, it becomes possible to provide the electronic apparatus with further increased functions without inviting enlargement of the electronic apparatus or deterioration in the operational efficiency or to form the apparatus compact, without inviting deterioration in the operational readiness or efficiency.

BEST MODE OF EMBODYING THE INVENTION

First Embodiment

Next, a first embodiment of the present invention will be described with reference to the accompanying drawings.

Some non-limiting examples of the electronic apparatus with a protective panel relating to the present invention are a mobile phone, a "smart" phone, a PDA, a car navigation apparatus, a digital camera, a digital video camera, a game machine, and a tablet. In this, a cell phone 1 will be explained as one example.

FIG. 1 is a perspective view of the cell phone 1. FIG. 2 is a cross sectional view taken along a line II-II in FIG. 1, of principal portions, showing a construction of a protective panel according to the first embodiment, FIG. 3 is an exploded perspective view showing the construction of the protective panel according to the first embodiment.

As shown in FIGS. 1-3, in this mobile phone 1 as an example of an electronic apparatus with a protective panel, includes an enclosure 2 made of a synthetic resin forming a display window 2A in its front face, the enclosure 2 mounting therein a display deice 3 having a display section 3A made of liquid crystal or organic EL, etc., a protective panel 4 for protecting the surface of the display device 3, and a plurality of input keys 5, etc.

The display window 2A of the enclosure 2 is formed concave with a stepped portion to allow fitting of the protective panel 4 therein. And, the display window 2A is open in its bottom face, with an aperture portion 2a for exposing the display section 3A of the display device 3 mounted within the enclosure 2 to the outside and a frame-like support portion 2b for supporting a back face peripheral edge 4A of the protective panel 4.

The shape and size of the display window 2A can vary, depending on the shape and size of the protective panel 4. Further, the concavity depth of the display window 2A can also vary depending on e.g. the thickness of the protective panel 4. Moreover, the shape and size of the aperture portion 2a of the display window 2A can vary, depending on the shape and size of the display section 3A. In this embodiment, the display window 2A, the aperture portion 2a, the display section 3A and the protective panel 4 are formed rectangular or approximately rectangular, and the concavity depth of the display window 2A is set to render the surface of the enclosure 2 and the surface of the protective panel 4 disposed in a same level.

The protective panel 4 can be configured selectively as either one having the so-called touch input function for detecting X-Y coordinates of an operated position of a touch operation on the protective panel 4, or one not having such touch input function. And, the touch-input type panel can be selectively configured as one of a resistor-film type, a capacitance type, an electromagnetic induction type, etc. In this embodiment, one comprising a resistor-film, touch input function will be explained as an example.

As shown in FIG. 2 and FIG. 3, the protective panel 4 includes a support plate 6 formed of a resin having superior transparency, rigidity, and workability, a lower electrode film 7 affixed to the upper face of the support plate 6, an upper electrode film 8 disposed in upward opposition to the lower electrode film 7 via an air layer, a design sheet 9 affixed to the upper face of the upper electrode film 8, etc., so that the panel is configured as one having the resistor-film type touch panel function.

As the resin used for the support plate 6, selection is possible from among those having superior transparency, rigidity and workability, such as polycarbonate resin (PC), methacrylc resin (PMMA), acrylonitrile-styrene copolymer resin (AS), acrylonitrile-butadiene-styrene copolymer resin (ABS), cellulose-propionate (CP), polystyrene (PS), polyester resin, and polyethylene resin (PE), and it is preferred to employ polycarbonate resin (PC) or methacryhc resin (PMMA) having especially good transparency.

Also, the thickness of the support plate 6 can be selected from the range of 0.5 to 3.0 mm. In particular, 1.0 mm is preferred.

FIG. 4 is a plan view of the lower electrode film, and FIG. 5 is a bottom view of the upper electrode film, respectively.

As shown in FIGS. 2-4, the lower electrode film 7 is formed by forming, on the upper face of a transparent insulating substrate 7A, a rectangular transparent conductive film 7B, a par of parallel lower bus bars 7C disposed along the two opposed sides of the transparent conductive film 7B, a pair of lead circuits 7D disposed along the perimeter of the transparent conductive film 7B, a pair of relaying electrodes 7E, and a frame-like bonding layer 7F.

As shown in FIGS. 2, 3 and 5, the upper electrode film 8 is formed by forming, on a lower face of a flexible transparent insulating substrate 8A having flexibility to be flexed when e.g. being depressed with a finger, a rectangular transparent conductive film 8B, a pair of parallel upper bus bars 8C disposed along the two opposed sides of the transparent conductive film 8B, and a pair of lead circuits 8D and a pair of relaying electrodes 8E disposed along the perimeter of the transparent conductive film 8B.

The transparent insulating substrate 7A of the lower electrode film 7 and the flexible transparent insulating substrate 8A of the upper electrode film 8 can be formed of an engineering plastics such as polycarbonate, polyamide, polyetherketone type or a transparent film of acryl, polyethylene terephthalate, polybutylene terephthalate, etc.

The transparent conductive films 7B, 8B of the lower electrode film 7 and the upper electrode film 8 can be formed of a metal oxide film of tin oxide, indium oxide, antimony oxide, zinc oxide, cadmium oxide, indium tin oxide (ITO), etc. a composite film containing such metal oxide as above as the principal component, or a metal film of gold, silver, copper, tin, nickel, aluminum, paradigm, etc. Further, the transparent conductive films 7B, 8B can be multiple-layer construction comprised of two or more layers.

Some non-limiting examples of the method of forming the transparent conductive films 7B, 8B include vacuum deposition method, sputtering method, ion-plating method, CVD method, etc.

As shown in FIGS. 2 through 4, on a surface of one of the transparent conductive films 7B, 8B, there can be formed a plurality of fine-dot-like spacers 10 for preventing erroneous contact between these transparent conductive films 7B, 8B when these are placed in opposition to each other.

The spacers 10 can be formed of a transparent light-curing resin such as epoxy acrylate type or urethane acrylate type, or a transparent heat-curing type resin of polyester type or epoxy type. Further, some non-limiting examples of the method of forming the spacers 10 include a printing method such as screen printing technique or photo processing technique.

The lower bus bars 7C, the upper bus bars 8C, the lead circuits 7D, 8D and the relaying electrodes 7E, 8E can be formed by using a conductive paste of a metal such as gold, silver, copper, nickel, etc. or carbon. Some non-limiting examples of the method of forming these include printing methods such as screen printing method, offset printing method, gravure printing method, flexographic printing method, the photo resist method, and brush applying method.

In general, the lower bus bars 7C and the upper bus bars 8C are formed such that these are formed as closely as possible to the ends of the transparent insulating substrate 7A or the flexible transparent insulating substrate 8A, so as to ensure, at the center portion of the transparent insulating substrate 7A or the flexible transparent insulating substrate 8A, as large as possible an area where these lower bus bars 7C or the upper bus bars 8C are not formed.

The size and the shape of the area where the lower bus bars 7C or the upper bus bars 8C are not formed, that is, the input area or the display area, can be variably set, depending on the size and the shape of the input area or the display area of the electronic apparatus with a protective panel such as the cell phone 1.

As shown in FIG. 2 and FIG. 3, the design sheet 9 is formed by forming a hard-coat layer on the upper face of the flexible transparent insulating substrate 9A and forming a picture design layer and a bonding layer on the lower face of the same.

The flexible transparent insulating substrate 9A of the design sheet 9 can be formed of an engineering plastics such as polycarbonate, polyamide, polyether-ketone type or a transparent film of acryl, polyethylene terephthalate, polybutylene terephthalate, etc.

The thickness of the flexible transparent insulating substrate 9A can be selected from the range from 50 to 200 µm, preferably from the range from 100 to 125 µm.

The material used for the hard-coat layer of the design sheet 9 can be an inorganic material such as siloxane type resin, acrylic epoxy type resin or an organic material such as urethane type heat-curing type resin or acrylate type light-curing resin. The thickness of the hard-coat layer ranges appropriately from 1 to 7 µm.

Some non-limiting examples of the method of forming the hard-coat layer include coating methods such as rohl-coating method, spray-coating method, or conventional printing methods such as screen printing method, offset printing method, gravure printing method, flexographic printing method, etc. Further, the hard-coat layer may be formed directly on the upper face of the flexible transparent insulating substrate 9A on whose lower face the picture design layer and the bonding layer are directly formed, or may be formed on a farther flexible transparent insulating substrate than the flexible transparent insulating substrate 9A on whose lower face the picture design layer and the bonding layer are directly formed; then, these two flexible transparent insulating substrates may be affixed to each other.

The deign sheet 9 may be subject to a non-glare treatment for preventing light reflection, such as forming unevenness in the flexible transparent insulating substrate 5 or the hard-coat layer, or mixing fine particles of silica or alumina, as a body pigment.

As the picture design layer, it is possible to employ a coloring ink containing as a binder such as polyvinyl type resin, polyamide type resin, polyester type resin, polyacryl type resin, polyurethane type resin, polyvinyl acetal type resin, polyester urethane type resin, alkyd resin and containing also a pigment or dye of an appropriate color as a coloring agent.

As the method of forming the picture design layer, a standard printing method such as screen printing, offset printing, gravure printing, flexographic printing, etc. may be employed. For effecting multiple-color printing or gradation representation, offset printing and the gravure printing are suitable.

Also, the picture design layer can be comprised of a metal thin layer or a combination of a picture design printed layer and a metal thin layer. The metal thin layer is used for presenting a metallic luster, as a picture design layer, and this is formed by such method as vacuum deposition method, sputtering method, ion-plating method, metal plating method, etc. In this case, in accordance with a metallic luster desired to be presented, a metal such as aluminum, nickel, gold, platinum, chromium iron, copper, tin, indium, silver, titanium, lead, zinc, or an alloy or compound of these. The film thickness of the metal thin layer is set generally to 0.05 µm. Further, in disposing the metal thin player, a pre-anchoring layer or a post-anchoring layer may be provided in order to improve its bonding property relative to other layers.

As the bonding layer, a resin having a heat-sensitive or pressure-sensitive property suitable for use with the flexible transparent insulating substrate 8A of the upper electrode film 8 or the flexible transparent insulating substrate 9A of the design sheet 9 is used appropriately. For example, in case the flexile transparent insulating substrate 8A, 9A are of the polycarbonate or polyamide type, polycyclic resin, polystyrene resin, polyamide resin may be used. Further, in case the flexile transparent insulating substrate 8A, 9A are of the acrylic type or the polyethylene terephthalate type, the vinyl chloride, vinyl acetate, acrylic copolymer may be used.

Some non-limiting examples of the method of forming the bonding layer include conventional printing methods such as screen printing method, offset printing method, gravure printing method, flexographic printing method, etc.

FIG. 6 is a cross sectional view of principal portions showing a construction of a protective panel according to a first embodiment.

Next, with reference to FIGS. 2 through 6, there will be described in details the construction of the protective panel 4 having the resistor-film type touch input function illustrated in this embodiment.

First, on one face of a flexible transparent insulating substrate 8A formed of a polyethylene terephthalate film (referred to shortly as "PET film" hereinafter) in the form of a roll with 75 µm thickness, an acrylic type hard-coat of UV-curing type is applied by a roll coater, whereby a PET film having a hard-coat on one side thereof is obtained. Thereafter, on this hard-coat, an indium tin oxide film (referred to shortly as "ITO film" hereinafter) is formed by sputtering.

Next, after the film is cut into a sheet form with predetermined vertical and horizontal lengths, on the ITO film, an etching resist is applied in the form of a pattern, by the screen printing technique, and then unnecessary ITO film portions are removed by sulfuric acid, thus forming a rectangular transparent conductive film 8B.

After the etching, the resist is removed by alkaline wash and then, by the screen printing using silver paste along the two opposed sides and perimeter of the transparent conductive film 8B, there are formed a pair of parallel upper bus bars 8C, a pair of lead circuits 8D and a pair of relaying electrodes 8E.

With the above, there is obtained an upper electrode film B.

Next, on both faces of a flexible transparent insulating substrate 9A formed of a PET film in the form of a roll with 125 µm thickness, an acrylic type hard-coat of UV-curing type is applied by a roll coater, whereby a PET film having a hard-coat on both sides thereof is obtained.

Thereafter, this film is cut into a sheet of the same vertical and horizontal lengths as the upper electrode film 8, and on face of this sheet, a picture design layer and a bonding layer comprised of a transparent adhesive agent containing acrylic acid ester as the principal component are formed by the gravure printing technique.

With the above, there is obtained a design sheet 9.

Then, the upper electrode film 8 and the design sheet 9 obtained as described above are affixed to each other across the entire faces thereof via the bonding layer of the design sheet 9 such that the ITO film un-formed face of the upper electrode film 8 and the picture design layer face of the design sheet 9 are placed in opposition to each other.

On the other hand, on both faces of the transparent insulating substrate 7A formed of a rolled polycarbonate film (referred to shortly as "PC film" hereinafter) having 100 µm thickness, an acrylic type hard-coat of UV-curing type is applied by a roll coater, whereby a PC film having a hard-coat on both sides thereof is obtained. And, then, on one face of the resultant film, an ITO film is formed by sputtering.

Then, this film is cut into the form of a sheet having same vertical and horizontal dimensions as the upper electrode film 8, and on the ITO film, an etching resist is applied in the form of a pattern by the screen printing technique, and unnecessary ITO film portions are removed by sulfuric acid, whereby a rectangular transparent conductive film 7B is formed.

Next, on the entire surface of the transparent conductive film 7B, a plurality of fine dot-like spacers 10 are formed by the screen printing technique using an epoxy acrylate type, heat-curing resin. Also, on the two opposed sides and perimeter of the transparent conductive film 7B, there are formed, by the screen printing technique using silver paste, a pair of parallel lower bus bars 7C, a pair of lead circuits 7D and a pair of relay electrodes 7E.

Thereafter, to the pair of relay electrodes 7E and two connecting portions 7G following the respective relay electrodes 8E of the upper electrode film 8, an adhesive agent containing nickel-plated resin beads is applied by the screen printing technique. Further, to the peripheral edge portion excluding the above portions, an adhesive agent ink containing acrylic acid ester as the major component thereof is applied by the screen printing technique, thus forming a frame-like adhesive layer 7F.

With the above, there is obtained a lower electrode film 7.

Next, on the entire ITO film un-formed face of the lower electrode film 7, as a support plate 6, a polycarbonate plate 1.0 mm in thickness, is affixed and bonded with using an adhesive agent containing acrylic acid ester as the major component thereof. Thereafter, in one lateral edge portion of the peripheral edge thereof, four through holes 11 are formed by drilling in a straight alignment along one lateral edge thereof The four through holes 11 are 11 mm in diameter and formed parallel to the thickness direction of the support plate 6 and the lower electrode lm 7 and extend through the relaying electrodes 7E or the connecting portions 7G. Within each through hole 11, silver paste as a conductive agent is charged and filled by means of a dispenser.

Thereafter, the lower electrode film 7 affixed and bonded with the support plate 6 and the upper electrode film 8 affixed and bonded with the design sheet 9 are bonded and affixed to each other via the bonding layer 7F of the lower electrode film 7, in such a manner that the respective transparent conductive layers 78, 8B are in opposition to each other via the air layer, the lower bus bars 7C and the upper bus bars 8C extend normal to each other, and the portions of the upper electrode film 8 where the relay electrodes 8E are formed and the portions where the through holes 11 corresponding thereto are formed are in registry with each other.

Next, a flexible printed circuit (referred to shortly as "FPC" hereinafter) is fabricated by a film comprised of a polyimide film with a circuit formed of a copper foil being formed on one face thereof. And, at terminal electrode portions of the resultant FPC, holes are drilled, which holes are then placed in alignment with the through holes 11 of the support plate 6 and metal pins 12 are inserted into these holes by means of a supersonic wave pressing device and cables 13 capable of picking up touch input signals are provided on the non lower electrode film affixed face of the support plate 6.

With the above, there is obtained a resistor-mfil type protective panel 4 having touch input functions.

As shown in FIG. 2, FIG. 3 and FIG. 6, in this protective panel 4, at a back face peripheral edge portion 4A, that is, at the peripheral edge portion of the non, lower electrode film affixed face of the support plate 6, there is provided a pressure-sensitive conductive rubber 14.

When the protective panel 4 is fitted and engaged within the display window 2A of the enclosure 2, the pressure-sensitive conductive rubber 4 is interposed between the support portion 2b of the display window 2A and the back face peripheral edge portion 4A of the protective panel 4, thereby to prevent intrusion of foreign substance such as water, dust, or the like. through the display window 2A to the interior of the enclosure 2, and also to enable detection of a depressing operation (detection of its Z coordinate) effected to the protective panel 4.

The pressure-sensitive conductive rubber 14 is constructed as an analog type which provides a resistance value variable in accordance with a magnitude of the depressing operation.

The pressure-sensitive conductive rubber 14 is comprised preferably of an insulating rubber such as nitrile rubber, styrene butadiene rubber, silicone rubber, fluorine rubber, etc, with conductive particles formed of nickel or gold-plated resin beads being uniformly dispersed therein. In particular, in case it is required to use the rubber in a wide temperature range, silicone rubber is preferably used. Whereas, in case importance is placed in the sealing performance, fluorine rubber is preferably used. Further, as the conductive particles to be dispersed within the rubber, though this will depend on the thickness of the rubber, spherical particles having a diameter from 10 to 100 μm at least smaller than the thickness of the rubber are preferred, and the amount of dispersion may be appropriately adjusted in accordance with the pressure sensitivity.

One possible example of a method used for mounting the pressure-sensitive conductive rubber 14 is affixing a pre-formed and worked pressure-conductive conductive rubber 14 to the support plate 6 by means of a double-sided adhesive tape or an adhesive agent. Or, a groove may be formed by means of a router or a laser work machine in the back face peripheral edge portion of the support plate 6 and then, the rubber may be embedded within a groove 4a formed by this groove forming step. Further alternatively, the pressure-sensitive conductive rubber 14 may be prepared in the form of an ink and then this ink may be applied by the screen printing technique or using a dispenser and then dried.

If the pressure-sensitive conductive rubber 14 is embedded within the groove of the support plate 6, this will improve the sealing performance and also provide superior water-proof and dust-proof performance. Therefore, preferably, a similar groove cutting operation is effected on the enclosure 2 side also, so as to embed the rubber within the resultant groove. In this, the thickness of the groove is set smaller than the thickness of the pressure-sensitive conductive rubber 14, preferably, set to ½ to ⅓ of the thickness of the pressure-sensitive conductive rubber 14.

FIG. 7 is a perspective view showing attaching constructions of the protective panel and the pressure-sensitive conductive. rubber according to the first embodiment.

Next, with reference to FIG. 2, FIG. 3, FIG. 6 and FIG. 7, the mounting construction of the pressure-sensitive conductive rubber 14 relative to the protective panel 4 according to this embodiment will be described in details.

First, a router is used for cutting a groove of 1.2 mm in width and 0.2 mm in depth, in the back face peripheral edge portion 4A of the protective panel 4, thereby forming a loop-like groove 4a along the peripheral edge of the protective panel 4. In this, the forming portions are set in advance such that the through holes 11 and the cables 13 of the back face peripheral edge portion 4A may be located on the inner side of the protective panel 4 than the groove 4a.

Next, in fluorine rubber, conductive particles comprised of nickel or gold-plated resin beads having 20 μm diameter are dispersed uniformly and this is formed into the form of a loop having 1 mm width and 0.5 mm thickness, with electrodes 16 formed of a loop-like conductive member being provided at the top and bottom thereof, whereby an analog type pressure-sensitive conductive rubber 14 is obtained. Then, to the plate-like electrodes 16 provided on the top and bottom faces of this pressure-sensitive conductive rubber 14, a lead wire 17 is connected and this is then embedded within the groove 4a of the protective panel 4. That is to say, the electrodes 16 of this embodiment are a pair of electrodes opposed across the pressure-sensitive conductive rubber 14.

With this, the protective panel 4 functions as a movable portion M movable relative to the enclosure 2. And, there is obtained the protective panel 4 having the pressure-sensitive conductive rubber 14 and functioning as the movable portion M, thus enabling detection of a depressing operation effected on the protective panel 4 (movable portion M).

The lead wire 17 is caused to extend from the electrodes 16 to the inner side of the protective panel 4, and includes, at the terminal end thereof, a connector 18 to be connected to a control unit 20 provided inside the enclosure 2. In operation, the control unit 20 determines that a depressing operation has been effected on the protective panel 4 when an input load to the protective panel 4 which is transmitted via the connector 18 becomes equal to or greater than a threshold value. Specifically, the control unit 20 determines that a depressing operation has been effected on the protective panel 4 if a resistance value between the pair of electrodes 16 transmitted via the connector 18 becomes equal to or smaller than a predetermined threshold value, as will be detailed later.

FIG. 8 is a view showing relationship (F-R characteristics) between an input load F applied to the pressure-sensitive conductive rubber and a resistance value R between the pair of electrodes 16. In the instant embodiment, the distance between the protective panel 4 (movable portion M) and the support portion 2b where the pressure-sensitive conductive rubber 14 is interposed is designed to become small in response to increase in the depressing force (load) by the depressing operation. Therefore, the resistance value of the pressure-sensitive conductive rubber 14 becomes smaller as the input load to the protective panel 4 becomes greater. In FIG. 8, a solid line A and a broken line B represent F-R characteristics for different pressure-sensitive conductive rubbers. As shown, it may be understood that a difference in the F-R characteristics occurs depending on the pressure-sensitive conductive rubbers. Therefore, when the pressure-sensitive conductive rubber is changed to a different one, it is necessary to calibrate the threshold value for the resistance value between the pair of electrodes 16 to determine occurrence of a depressing operation to the protective panel 4.

Specifically, in the case of the pressure-sensitive conductive rubber represented by the solid line A in FIG. 8, $R_A$ is a threshold value of the resistance value between the electrodes 16 corresponding to a threshold value $L_{th}$ of the input load. However, in the case of the pressure-sensitive conductive rubber represented by the broken line B in FIG. 8, $L_m$ is the input load when the threshold value of the resistance value between the electrodes 16 is $R_A$, and the input load $L_{th}$ needed for the determination of occurrence of a depressing operation to the protective panel 4 has not yet been obtained.

Therefore, based on information respecting F-R characteristics of pressure-sensitive conductive rubbers to be used, the control unit 20 stores therein threshold values for resistance values between the pair of electrodes 16 for enabling determination of occurrence of a depressing operation to the protective panel 4, in the case of using respective pressure-sensitive conductive rubbers. For instance, in the case of the pressure-sensitive conductive rubber represented by the solid line A in FIG. 8, $R_A$ is the threshold value for the resistance value between the electrodes 16 corresponding to the threshold value $L_{th}$ of the input load. And, in the case of the pressure-sensitive conductive rubber represented by the broken line B in FIG. 8, $R_B$ is the threshold value for the resistance value between the electrodes 16 corresponding to the threshold value $L_{th}$ of the input load.

As described above, even when the F-R characteristics of the pressure-sensitive conductive rubber used are different, the control unit 20 will set the threshold value for the resistance value between the pair of electrodes 16 appropriately, in accordance with the characteristics of the pressure-sensitive conductive rubber. That is, by effecting calibration, it becomes possible to accurately determine occurrence of a depressing operation to the protective panel 4 when there occurs a predetermined input load to the protective panel 4.

Second Embodiment

The electronic apparatus with a protective panel according to a second embodiment differs from that of the first embodiment in that the distance between the movable portion and the support portion where the pressure-sensitive conductive rubber is interposed is caused to increase in response to increase in the depressing force (load) by the depressing operation. Next, the electronic apparatus with a protective panel according to the second embodiment will be described, but, explanation of same constructions thereof as those in the first embodiment will be omitted.

FIG. 9 is a cross sectional view of principal portions showing the construction of a mobile phone 1 as an electronic apparatus with a protective panel according to the second embodiment. As shown, in the case of the cell phone 1 of the second embodiment too, the movable portion M is comprised of the protective panel 4. The enclosure 2 consists of a main body 21 and a lid portion 22 and the main body 21 and the lid portion 22 together bind therebetween the front and back faces of the protective panel 4. Specifically, in the bottom of the main body 21 of the enclosure 2, like the first embodiment, there are provided an aperture portion 2a for exposing, to the outside, the display section 3A of the display device 3 mounted inside the enclosure 2 and a frame-like support portion 2b for supporting the back face peripheral edge 4A of the protective panel 4. And, the lid portion 22 of the enclosure 2 is opened so as to form the display window 2A for exposing the surface of the protective panel 4 to the outside. And, in the back side face of the lid portion 22 of the enclosure 2, there is defined the frame-like support portion 2b for supporting the front face peripheral edge 4A of the protective panel 4.

And, the protective panel 4 is supported from its back side to the support portion 2c of the main body 21 via an elastic member 23 and is supported also from its front side to the support portion 2b of the lid portion 22 via the above-described pressure-sensitive conductive rubber 14. That is to say, the front and back sides of the protective panel 4 (movable portion M) are bound and retained between the lid portion 22 and the main body 21 of the enclosure 2. Therefore, in the present embodiment, the distance between the movable portion M (protective panel 4) and the support portion 2b where the pressure-sensitive conductive rubber 4 is interposed is designed to increase in accordance with increase in the depressing force (load) by the depressing operation from the front side of the protective panel 4. FIG. 10 shows the relationship (F-R characteristics) between the input load F to the pressure-sensitive conductive rubber and the resistance value R according to the instant embodiment. Specifically, the resistance value of the pressure-sensitive conductive rubber 14 increases as the input load to the protective panel 4 increase. Further, like the first embodiment, the control unit (not shown) determines that a depressing operation to the protective panel has taken place when the resistance value between the electrodes 16 becomes equal to or greater than a predetermined threshold value.

Third Embodiment

The electronic apparatus with a protective panel according to a third embodiment differs from those of the first and second embodiments in that the movable portion is comprised of the protective panel and the display device. Next, the electronic apparatus with a protective panel according to the third embodiment will be described, but, explanation of same constructions thereof as those in the foregoing embodiments will be omitted.

FIG. 11 is a cross sectional view of principal portions showing the construction of a cell phone 1 as an electronic apparatus with a protective panel according to the third embodiment. As shown, in the case of the cell phone 1 of the third embodiment, the movable portion M includes the protective panel 4 and the display device 3. Specifically, the back face of the protective panel 4 and the front face of the display section 3A are bonded to each other with a transparent adhesive agent. As the protective panel 4 is formed larger in area than the display device 3, a step portion is formed in the lateral face of the movable portion M. And, in correspondence with the step portion in the lateral face of the movable portion M, a step portion is formed also inside the display window 2A of the enclosure 2. And, in the lowermost, bottom face of the display window 2A of the enclosure 2, there is defined a frame-like support portion 2b for supporting, via the pressure-sensitive conductive rubber 14, the back face peripheral edge portion 3B of the display device 3 as the movable portion M. Further, in this support portion 2b, like the groove 4a described hereinbefore in the first embodiment, there is formed a frame-like groove 2d within which the pressure-sensitive conductive rubber 14 is fitted.

As described above, in the case of the cell phone 1 as an electronic apparatus with a protective panel according to the third embodiment, although the protective panel 4 and the display device 3 are integrated, as these components, i.e. the protective panel 4 and the display device 3, are constructed as the movable portion M and a depressing operation to this movable portion M can be detected.

Further, in addition to the integration of the protective panel 4 and the display device 3 as the movable portion M as in the present embodiment, it is further possible, like the second embodiment, to configure such that the distance between the movable portion M and the support portion 2b where the pressure-sensitive conductive rubber 14 is interposed increases in response to increase in the depressing force by the depressing operation.

Fourth Embodiment

In the foregoing embodiments, there have been described the case of providing a pair of plate-like electrodes 16 on the top and bottom faces of the pressure-sensitive conductive rubber 14. However, the construction of the electrode 16 can vary. For instance, a pair of combtooth-like electrodes 16 can be provided on one face of a pressure-sensitive conductive rubber 14 having a rectangular cross section. Specifically, the comb teeth will be provided on the top or bottom face of the pressure-sensitive conductive rubber 14 having a rectangular cross section. FIG. 12(a) is a cross sectional view of the pressure-sensitive conductive rubber 14 in the instant embodiment. FIG. 12(b) is a perspective view of the pair of electrodes 16. In this case, when a depressing force (load) by a depressing operation is applied to the pressure-sensitive conductive rubber 14, as described in the foregoing embodiments, this causes a variation in the resistance of the pressure-sensitive conductive rubber 14. As a result, there occurs a corresponding change in the resistance value between the pair of electrodes 16. The control unit (not shown) determines whether a depressing operation to the protective panel 4 has been conducted or not, based on result of comparison between the resistance value between the pair of electrodes 16 and a predetermined threshold value.

As described above, the electrodes 16 can be provided only in one face of the pressure-sensitive conductive rubber 14, so the mounting of the electrodes 16 to the pressure-sensitive conductive rubber 14 is facilitated. Further, as the distance between the pair of electrodes 16 can be formed small, the resistance variation of the pressure-sensitive conductive rubber 14 can be detected with high sensitivity. In this, as there is no need for changing the thickness of the pressure-sensitive conductive rubber 14, a sufficient depressing space or margin can be ensured for the depressing operation to the protective panel 4 (movable portion M).

Further, the shape of the pair of electrodes 16 is not limited to the combtooth-like shape described above, but can be any other shape such as a loop shape.

Fifth Embodiment

An electronic apparatus with a protective panel according to a fifth embodiment differs in the cross sectional construction of the pressure-sensitive conductive rubber from those of the foregoing embodiments. Next, the electronic apparatus with a protective panel according to the fifth embodiment will be described, but, explanation of same constructions thereof as those in the foregoing embodiments will be omitted. It should be noted, however, that although there will be explained a case of the electrode 16 being configured as combtooth-like electrode in the following discussion, the construction can apply to the case using the opposing electrodes described in the first embodiment.

FIG. 13 is a cross sectional view of principal portions showing the construction of the electronic apparatus with a protective panel according to the fifth embodiment. As shown, the pressure-sensitive conductive rubber 14 is configured such that its cross sectional area along the direction normal to the applying direction (the vertical direction in the figure) of the depressing force F (load) by the depressing operation varies continuously in the applying direction of the depressing force. More particularly, the cross section of the pressure-sensitive conductive rubber 14 is formed with a greater width on its side placed in contact with the protective panel 4 and with a smaller width on its side placed in contact with the support portion 2b of the enclosure 2. That is to say, the lateral face of the pressure-sensitive conductive rubber 14 is formed with a slope relative to the support portion 2b of the enclosure 2. And, the pressure-sensitive conductive rubber 14 is fitted within both the groove 4a formed in the protective panel 4 and the groove 2d formed in the support portion 2b of the enclosure 2. Further, the pair of combtooth electrodes 16 provided on one face of the pressure-sensitive conductive rubber 14 are disposed in contact with the protective panel 4.

FIG. 14 is a figure showing relationship (F-R characteristics) between the input load F to the pressure-sensitive conductive rubber shown in FIG. 13 and the resistance value R between the pair of electrodes 16. In the case of the pressure-sensitive conductive rubber 14 having the rectangular cross section, as shown in FIG. 8, the resistance value between the electrodes varies sharply from the initial stage of the application of the input load and at the final stage of application of the input load, the resistance value between the electrodes hardly varies according to a change in the input load.

However, in the case of the pressure-sensitive conductive rubber according to the instant embodiment, at the initial stage of application of the input load, the contact area of the support portion 2b of the enclosure 2 relative to the pressure-sensitive conductive rubber 14 is small. Therefore, as shown in FIG. 14, the change in the resistance value between the electrodes 16 according to change in the input load is not so large as that shown in FIG. 8, and also there occurs no sharp change in the resistance value between the electrodes 16 from the initial stage of the application of the input load. Further, the contact area progressively increases toward the final stage of application of the input load. Therefore, there occurs a reliable and definite change in the resistance value between the electrodes according to the change in the input load, so there does not occur the phenomenon illustrated in FIG. 8 in which the resistance value between the electrodes hardly varies.

As described above, by using the pressure-sensitive conductive rubber 14 according to the instant embodiment, it is possible to determine in a reliable manner the condition of the depressing force (input load) by the depressing operation from the initial stage to the fial stage of application of the input load, in accordance with change in the resistance value.

Further, instead of the variable cross sectional area configuration of the pressure-sensitive conductive rubber 14, as shown in FIG. 15, it is possible to configure that either one of the movable portion M and the support portion 2b of the enclosure 2 binding the pressure-sensitive conducive rubber 14 therebetween is continuously changed in its cross sectional area along the direction normal to the applying direction of the depressing force by the depressing operation, in the applying direction of the depressing force. In the instant embodiment, the support portion 2b (bottom face of the groove 2d) contacting the pressure-sensitive conductive rubber 14 is formed with a slope relative to the pressure-sensitive conductive rubber 14. Further, the pair of combtooth-like electrodes 16 provided on one face of the pressure-sensitive conductive rubber 14 are disposed so as to come into contact with the non-inclined protective panel 4 side, As a result, at the initial stage of application of the input load, the contact area of the support portion 2b of the enclosure 2 relative to the pressure-sensitive conductive rubber 14 is small. And, toward the final stage of application of the input load, there occurs progressive increase in this contact area. And, in this case too, like the case shown in FIG. 13, the condition of the depressing force (input load) due to a depressing operation can be determined in a reliable manner, in accordance with variation in the resistance value of the pressure-sensitive conductive rubber from the initial stage to the final stage of application of the input load.

As described above, it is possible to configure that one of the movable portion M and the support portion 2b of the enclosure 2 binding the pressure-sensitive conducive rubber 14 therebetween or this pressure-sensitive conductive rubber 14 per se is continuously changed in its cross sectional area along the direction normal to the applying direction of the depressing force by the depressing operation, in the applying direction of the depressing force.

Alternatively, as shown in FIG. 16(*a*) and FIG. 16(*b*), it is also possible to configure that one of the movable portion M and the support portion 2b of the enclosure 2 binding the pressure-sensitive conducive rubber 14 therebetween or this pressure-sensitive conductive rubber 14 per se is changed stepwise in its cross sectional area along the direction normal to the applying direction of the depressing force by the depressing operation, in the applying direction of the depressing force.

For instance, FIG. 17 shows a relationship (F-R characteristics) between the input load F to the pressure-sensitive conductive rubber shown in FIG. 16 and the resistance value R between the pair of electrodes 16. As shown, from the initial stage toward the final stage of application of the input load, there occurs stepwise change in the F-R characteristics. That is, in response to a change in the input load, the resistance value detected between the pair of electrodes too changes stepwise. As a result, it becomes easy to determine stepwise the condition of the depressing force (input load) by the depressing operation according to a change in the resistance value. That is to say, it becomes easy to effect not only a two-value determination of ON/OFF for the depressing operation to the protective panel 4 (movable portion M), but also to determine the input level of the depressing force (input load) by a depressing operation in multiple of discreet steps.

Sixth Embodiment

In the foregoing embodiments, at a portion of the protective panel subjected to application of a depressing force by a depressing operation, there may be provided a reinforcing structure member for reinforcing the rigidity of this protective panel. FIG. 18(*a*) is a perspective view showing mounting constructions of the protective panel and the pressure-sensitive conductive rubber. FIG. 18(*b*) is its cross section. As shown, in the back face of the protective panel 4 to which the pressure-sensitive conductive rubber 14 is mounted, there is provided a frame-ike rib 24 as such reinforcing structure member, adjacent its inner side of the pressure-sensitive conductive rubber 14. With the provision of this rib 24, the rigidity of the protective panel 4 against the depressing operation is increased, and e.g. flexion of the protective panel 4 is reduced. As a result, the depressing force by a depressing operation can be transmitted in a reliable manner to the pressure-sensitive conductive rubber 14, so that the depressing operation can be detected reliably.

In the above, as specific examples of the reinforcing structure member, in addition to the above-described rib which is formed integral with the protective panel, there are many others such as a reinforcing structure member provided separately in the form of a bar-like member of the same shape as the illustrated rib and bonded to the protective panel.

Further, FIG. 19(*a*) is a perspective view showing mounting constructions of the protective panel and the pressure-sensitive conductive rubber. FIG. 19(*b*) is its cross section. As shown, in the back face of the protective panel 4 to which the pressure-sensitive conductive rubber 14 is mounted, there is provided a frame-lke rib 24 adjacent the outer side of the pressure-sensitive conductive rubber 14. With the provision of this rib 24, the rigidity of the protective panel 4 against the depressing operation is increased, and e.g. flexion of the protective panel 4 is reduced. As a result, the depressing force by a depressing operation can be transmitted in a reliable manner to the pressure-sensitive conductive rubber 14, so that the depressing operation can be detected reliably.

As described above, there have described ribs as a plurality of embodiments of the reinforcing structure member. However, any other form of reinforcing structure member may be provided in the protective panel, as long as such other member too is capable of reinforcing the rigidity of the protective panel.

Seventh Embodiment

Next, a seventh embodiment of the present invention will be described with reference to the accompanying drawings.

This seventh embodiment differs from the first embodiment, only in the method of forming the pressure-sensitive conductive rubber 14, with the rest of the construction being the same as the first embodiment. Therefore, the following explanation concerns only the forming method of the pressure-sensitive conductive rubber 14.

In silicone rubber, conductive particles formed of nickel or gold-plated resin beads with a diameter of 20 μm are uniformly dispersed to form an ink. Then, this ink is applied to the groove 4a of the protective panel 4 by the screen printing technique and then dried to obtain an analog type pressure-sensitive conductive rubber 14 in the form of a loop having width of 1 mm and thickness of 0.4 mm.

Eighth Embodiment

Next, an eighth embodiment of the present invention will be described with reference to the accompanying drawings. This eighth embodiment differs from the first embodiment, only in the method of mounting the pressure-sensitive conductive rubber 14, with the rest of the construction being the same as the first embodiment. Therefore, the following explanation concerns only the mounting method of the pressure-sensitive conductive rubber 14.

As shown in the cross sectional view of FIG. 20 of principal portions showing the mounting constructions of the protective panel and the pressure-sensitive conductive rubber according to the eighth embodiment, to the back face peripheral edge portion 4A of the protective panel 4, the pressure-sensitive conductive rubber 14 is affixed with using a double-sided adhesive tape 15, without effecting any groove cutting operation thereto.

Evaluation Result (1) Z-axis (Pressure) Detection

Determination of variations in the resistance value between the pair of electrodes 16 was conducted, which resistance variations were obtained when the surface of the protective panel 4 with the touch input function and having the pressure-sensitive conductive rubber 14 obtained with the above construction was depressed with a leading end of R 0.8 polyacetal pen.

In this determination, as shown in FIG. 21, in response to increase in the pen input load between 0 and 2 N (about 200 gf), there was obtained a result of the resistance value of the pressure-sensitive conductive rubber 14 gradually dropping, so that it was confirmed that the pen input load can be detected through variation in the resistance value between the pair of electrodes 16.

(2) Water-Proof Performance

The protective panel 4 with the touch input function having the pressure-sensitive conductive rubber 14 obtained in the above construction was fitted within the display window 2A of the enclosure 2. Then, between this protective panel 4 and the enclosure 2, artificial sweat and water were introduced and under this condition, checking of operations of the touch input function and pressure detection were conducted.

As the result, as shown in FIG. 22, in the cases of the first embodiment and the seventh embodiment, high water-proof performance was obtained and in the case of the eighth embodiment, some intrusion of water was found, but relatively high water-proof performance was obtained.

As described above, with the protective panel 4 obtained with the above construction having the touch input function and including the pressure-sensitive conductive rubber 14, as the pressure-sensitive conductive rubber 14 is formed continuously in the form of a loop in its back face peripheral edge portion 4A, when a depressing operation is effected on the surface of the protective panel 4, regardless of the position of this depressing operation, the pressure to the protective panel 4 is applied to the pressure-sensitive conductive rubber 14, whereby the conductive particles dispersed within the rubber become connected to each other along the direction of the thickness of the rubber, which connection results in a drop in the resistance value between the electrodes 16 provided on the top and the bottom of the rubber.

And, when the protective panel 4 is depressed more strongly, the greater the deformation in the pressure-sensitive conductive rubber 14, the greater the number of connections of the conductive particles, thus in turn results in further drop in the resistance value between the electrodes 16.

That is to say, with the electronic apparatus having this protective panel 4, as the apparatus has the function as a variable pressure sensor for detecting a change in a resistance value according to a change in the depressing force to the protective panel 4 (movable portion M), so that the apparatus is capable of detecting a touch operation force, a drawing pressure of a pen, etc. As a result, if this protective panel 4 is employed in e.g. an electronic apparatus having a photographing function, the panel can be used as a zoom switch for varying a zooming speed or a shutter switch for varying a shutter speed, according to a magnitude of a depressing force applied thereto. Further, if the panel is employed in an electronic apparatus having an image drawing function, the panel can be employed as a drawing-pressure recognizing sensor for varying density according to the magnitude of the depressing force applied to the protective panel 4.

Furthermore, even when sweat, rainwater, water or powder dust enters the gap between the enclosure 2 and the protective panel 4, this will not pass through the pressure-sensitive conductive rubber 14 provided in the form of a loop, so that intrusion thereof to the interior of the enclosure 2 is effectively prevented. Accordingly, deterioration and short circuit of the through holes 11 and metal pins 12 as cable connections formed on the back face of the protective panel 4 can be avoided, and this further prevents deterioration of the display device 3 and the substrate (not shown), thus improving the reliability of the electronic apparatus.

Other Embodiments (1) In the case of the construction without effecting any groove cutting operation in the back face peripheral edge portion 4A of the protective panel 4, as the support plate 6, a glass plate of soda glass, borosilicate glass, hardened glass, etc. can be employed.

(2) As shown in FIG. 23, in the back face peripheral edge portion 4A of the protective panel 4, pressure-sensitive conductive rubbers 14 and insulating rubbers 19 may be arranged or formed integrally in the form of a loop such that the pressure-sensitive conductive rubbers 14 are disposed along the four sides thereof and the insulating rubbers 19 are disposed at the corners thereof, whereby the protective panel 4 having these rubbers 14, 19 may function as a cross-shaped switch.

(3) On the four sides of the pressure-sensitive conductive rubber 14 provided in the form of a loop, four sets of electrodes 16 formed separately in correspondence with these respective sides may be provided, so that the protective panel 4 having this pressure-sensitive conductive rubber 14 may function as a cross-shaped (arrow) switch.

(4) The electrodes 16 may be affixed with a tape or adhesive agent to the pressure-sensitive conductive rubber 14.

(5) To the support portion 2b of the enclosure 2 or the back-side peripheral edge portion 4A or the groove 4a of the protective panel 4, the electrodes 16 may be formed by a printing technique such as screen printing using a conductive paste of a metal such as gold, silver, copper nickel, etc. or carbon, or the like, offset printing, gravure printing, flexographic printing, or photo resist technique or brush applying technique.

(6) To the electrodes 16 of the pressure-sensitive conductive rubber 14, an FPC may be connected.

Industrial Applicability

The electronic apparatus with a protective panel according to the present invention can be utilized as a cell phone, a smart phone, a PDA, a car navigation device, a digital camera, a digital video camera, a game machine, and a tablet, in order to increase the functions of and to improve the operational readiness and efficiency of the electronic apparatus while avoiding or restricting enlargement or deterioration in the operational readiness and efficiency of the electronic apparatus, through effective utilzation of the protective panel originally provided therein.

BRIEF DESCRIPTION OF THE DRAWINGS

[FIG. 18](a) a perspective view showing the mounting constructions of a protective panel and a pressure-sensitive conductive rubber according to a sixth embodiment, (b) its cross sectional view,

[FIG. 19](a) a perspective view showing the mounting constructions of a protective panel and a pressure-sensitive conductive rubber according to a sixth embodiment, (b) its cross sectional view,

[FIG. 20] a cross sectional view of principal portions showing the mounting constructions of a protective panel and a pressure-sensitive conductive rubber according to an eighth embodiment,

Figure 1:
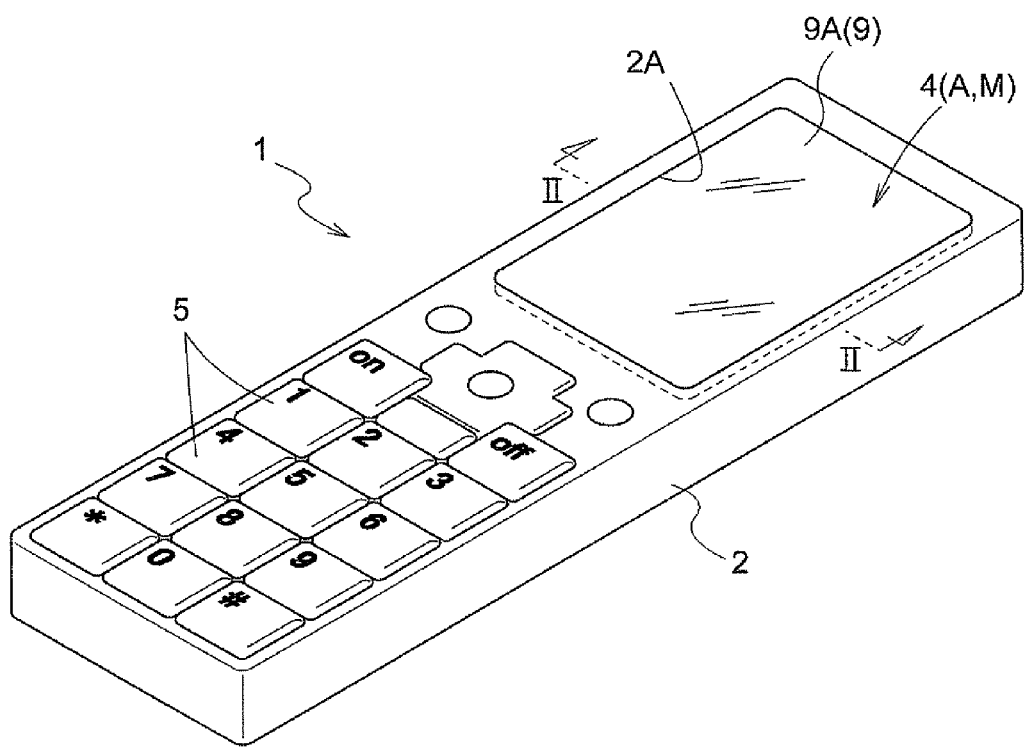
[FIG. 1] a perspective view of a cell phone.
Figure 2:
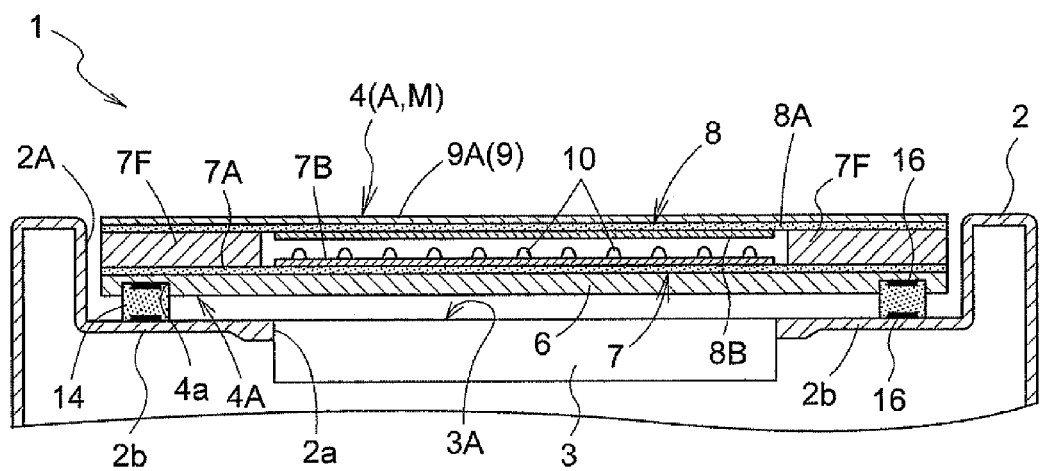
[FIG. 2] a cross sectional view of principal portions showing the construction of a protective panel according to a first embodiment.
Figure 3:
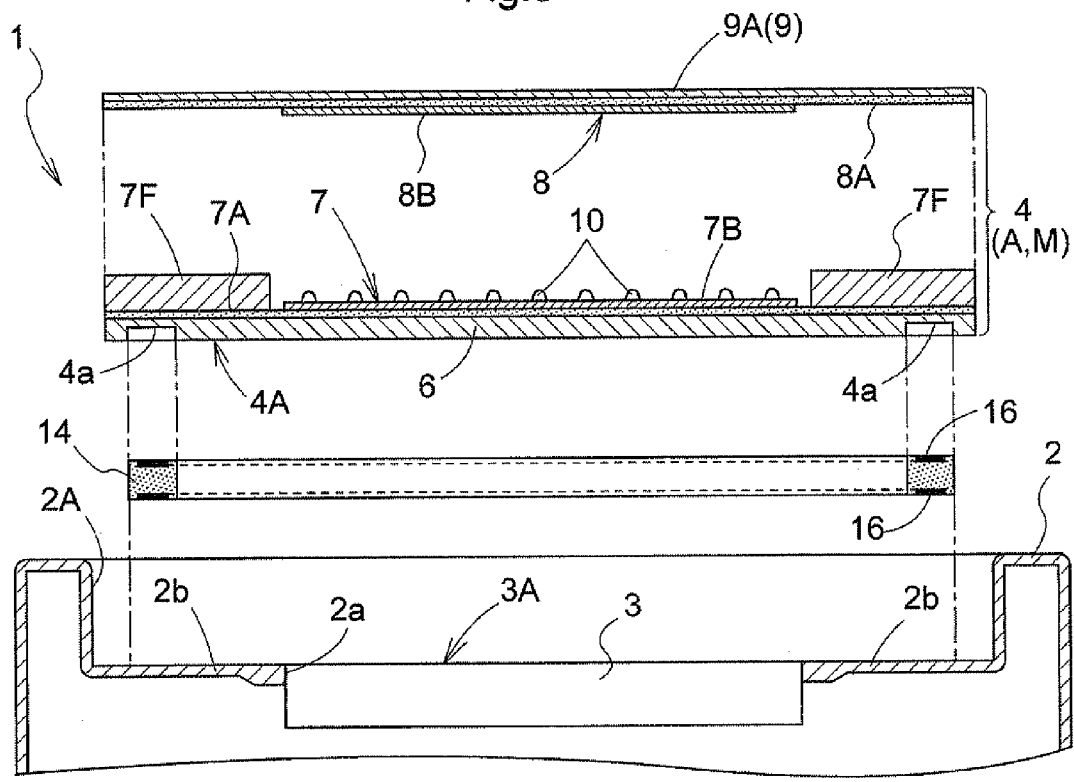
[FIG. 3] an exploded cross sectional view of principal portions showing the construction of the protective panel according to the first embodiment.
Figure 4:
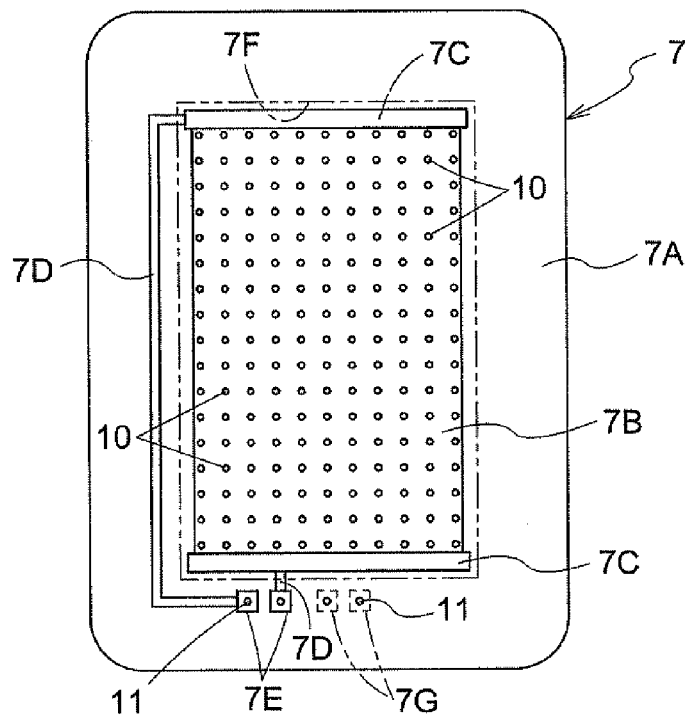
[FIG. 4] a plan view of a lower electrode film.
Figure 5:
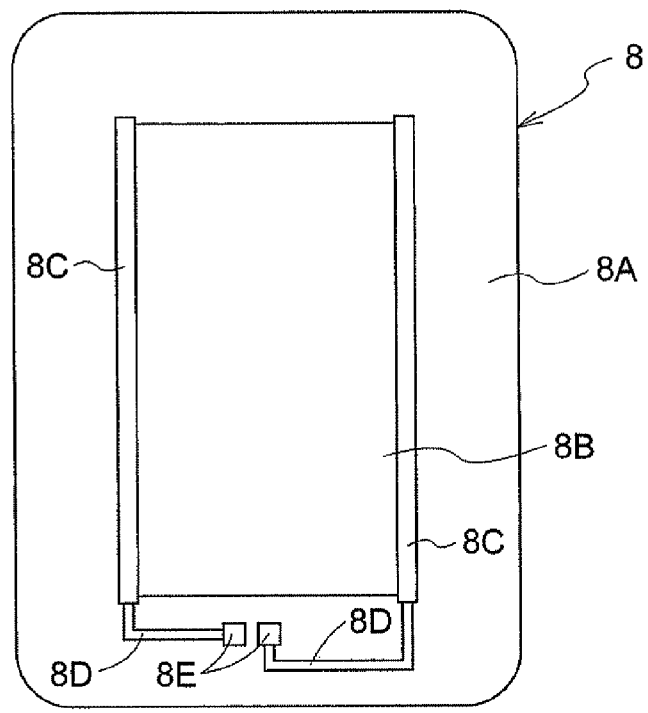
[FIG. 5] a bottom view of an upper electrode film.
Figure 6:
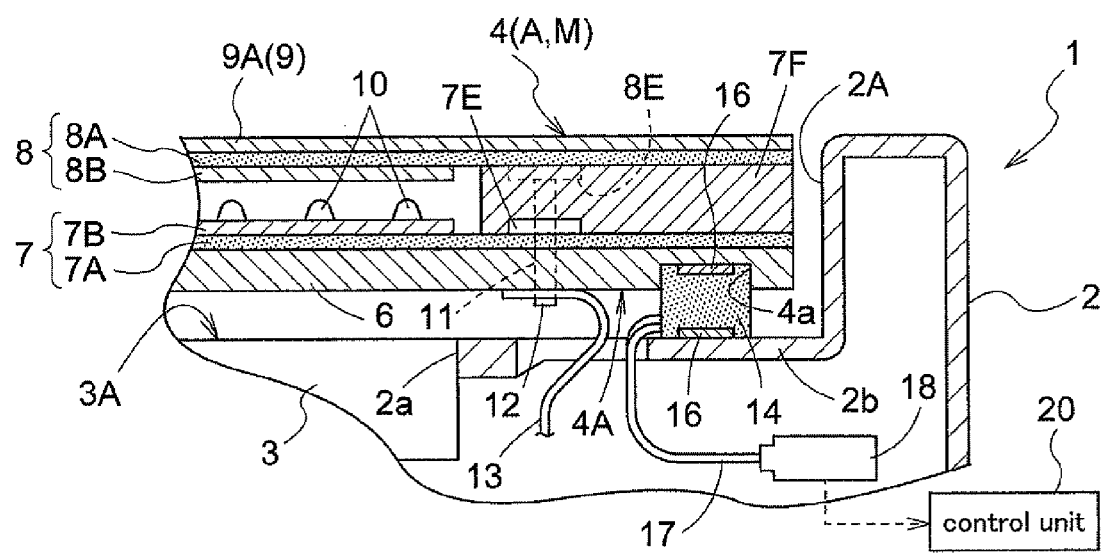
[FIG. 6] a cross sectional view of principal portions showing the construction of the protective panel according to the first embodiment.
Figure 7:
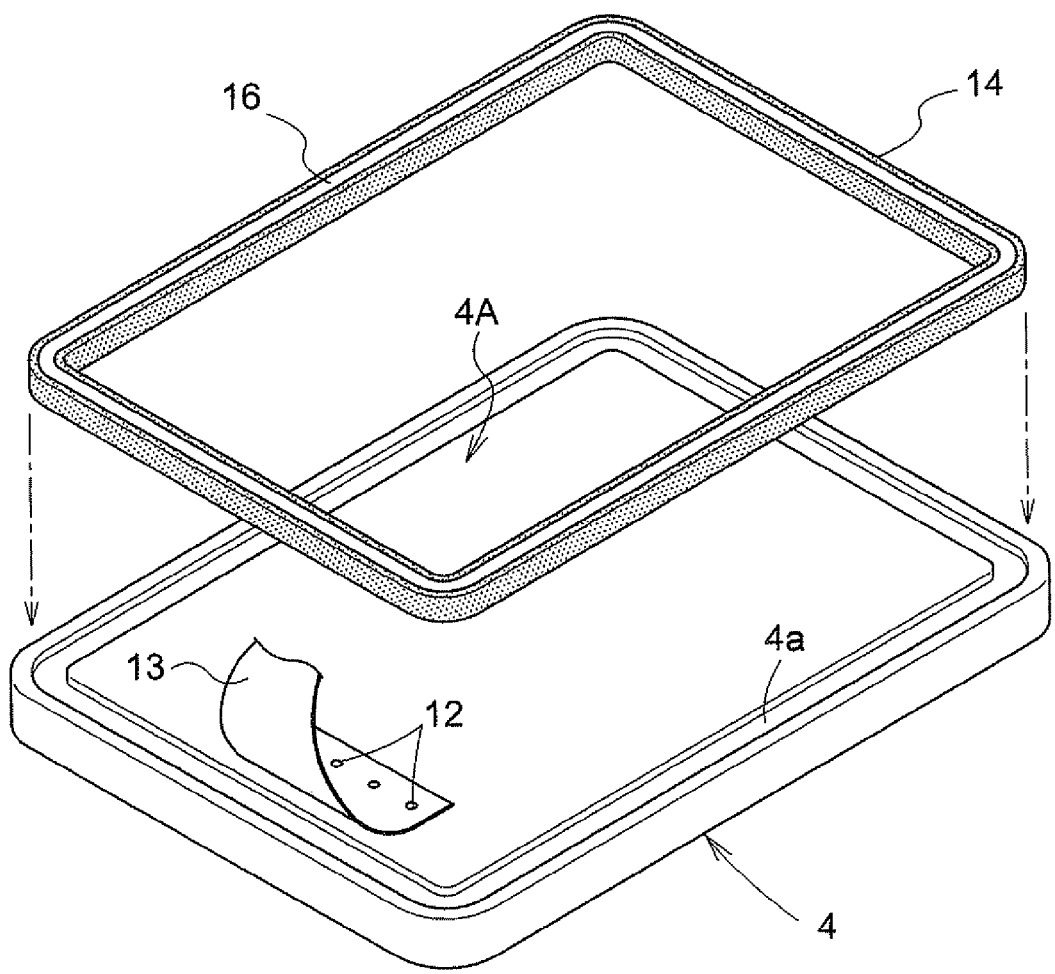
[FIG. 7] a perspective view showing the mounting construction of a pressure-sensitive conductive rubber to the protective panel according to the first embodiment.
Figure 8:
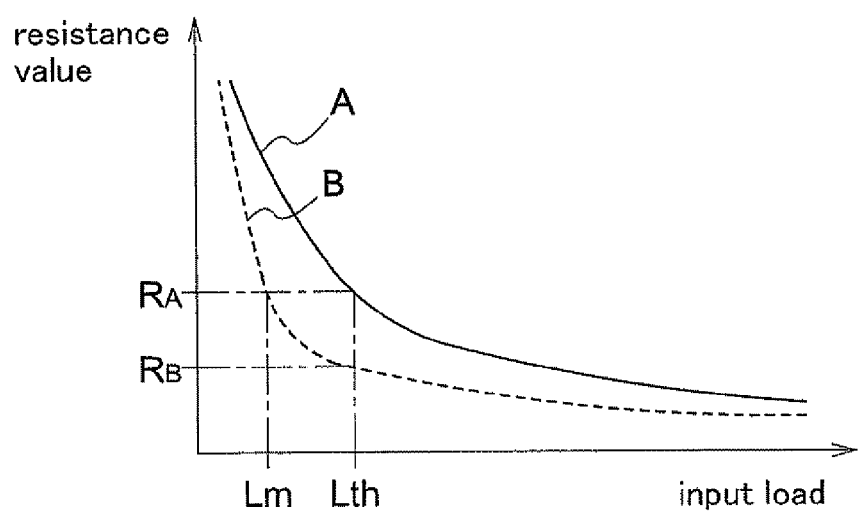
[FIG. 8] a view showing the F-R characteristics of the pressure-sensitive conductive rubber.
Figure 9:
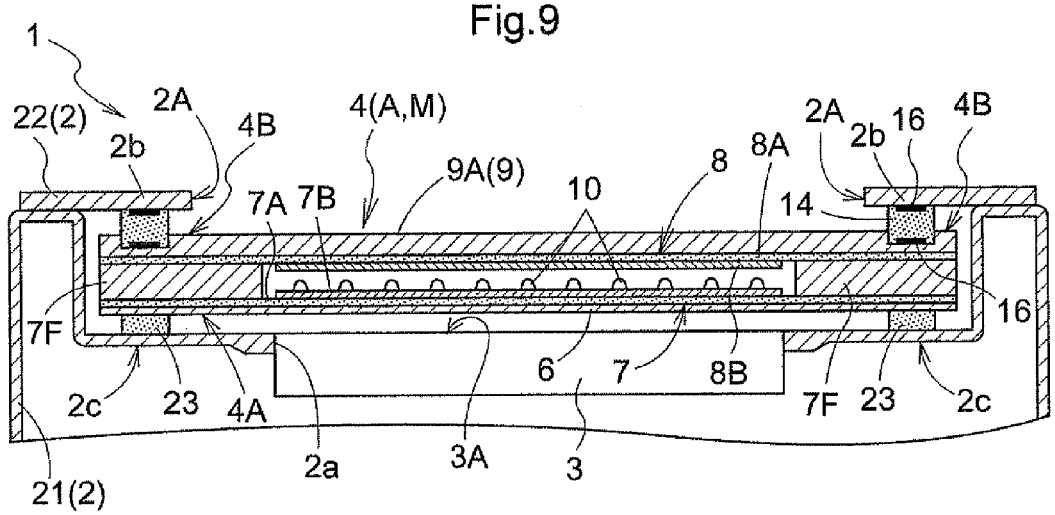
[FIG. 9] a cross sectional view of principal portions showing the construction of an electronic apparatus with a protective panel according to a second embodiment.
Figure 10:
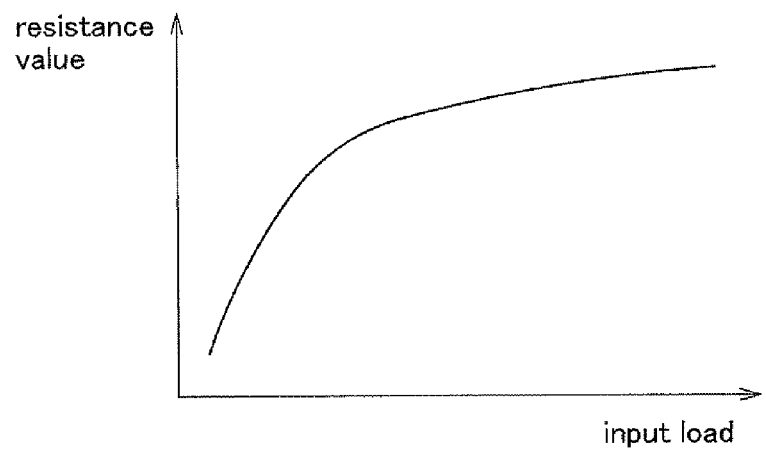
[FIG. 10] a view showing the F-R characteristics of the pressure-sensitive conductive rubber.
Figure 11:
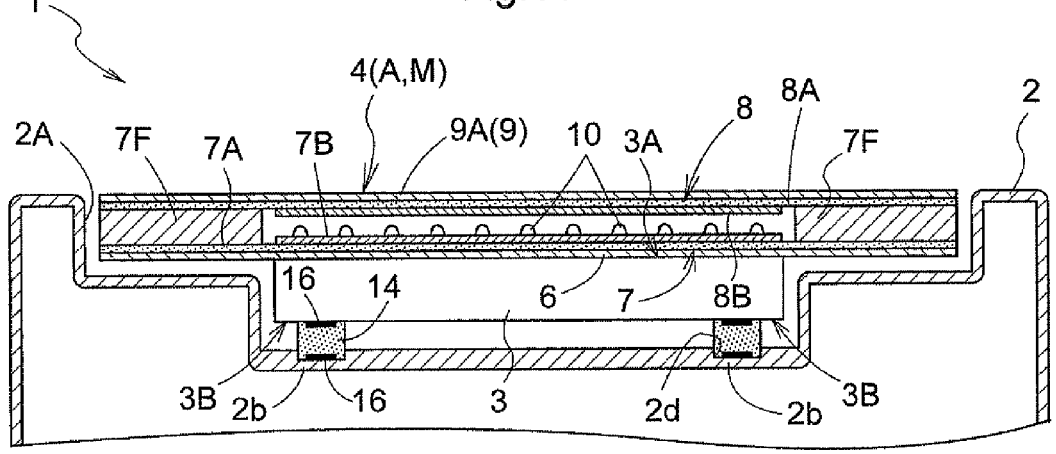
[FIG. 11] a cross sectional view of principal portions showing the construction of an electronic apparatus with a protective panel according to a third embodiment.
Figure 12:
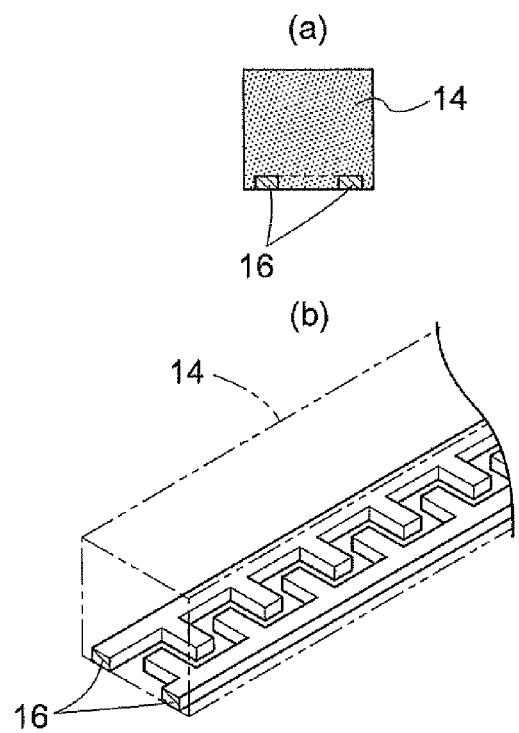
[FIG. 12](a) a cross sectional view of a pressure-sensitive conductive rubber according to a fourth embodiment, (b) a perspective view of electrodes.
Figure 13:
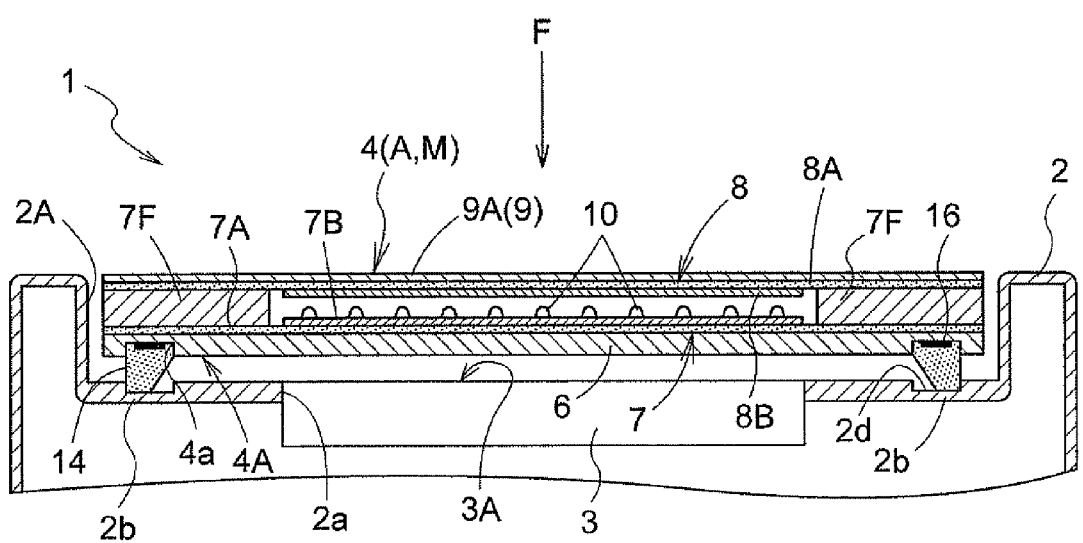
[FIG. 13] a cross sectional view of principal portions showing the construction of an electronic apparatus with a protective panel according to a fifth embodiment.
Figure 14:
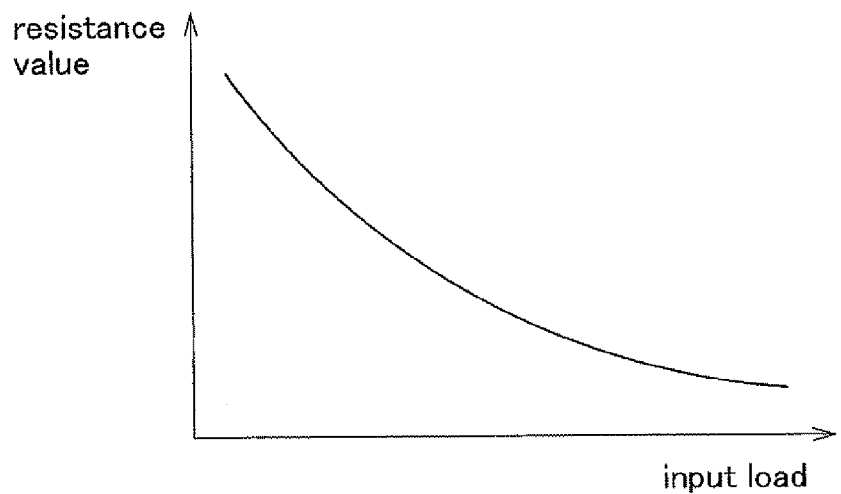
[FIG. 14] a view showing the F-R characteristics of the pressure-sensitive conductive rubber.
Figure 15:
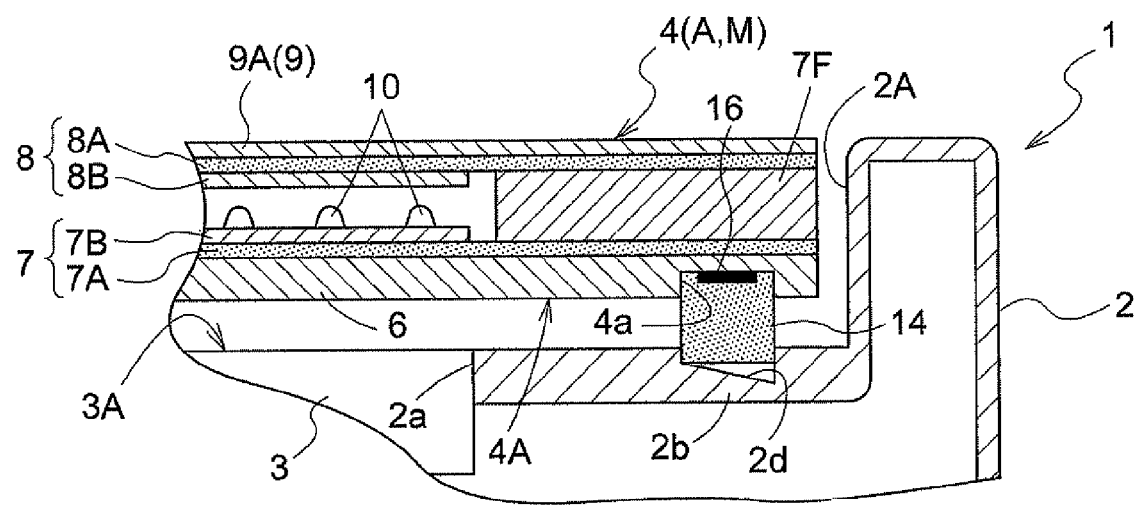
[FIG. 15] a cross sectional view of principal portions showing the construction of an electronic apparatus with a protective panel according to a fifth embodiment.
Figure 16:
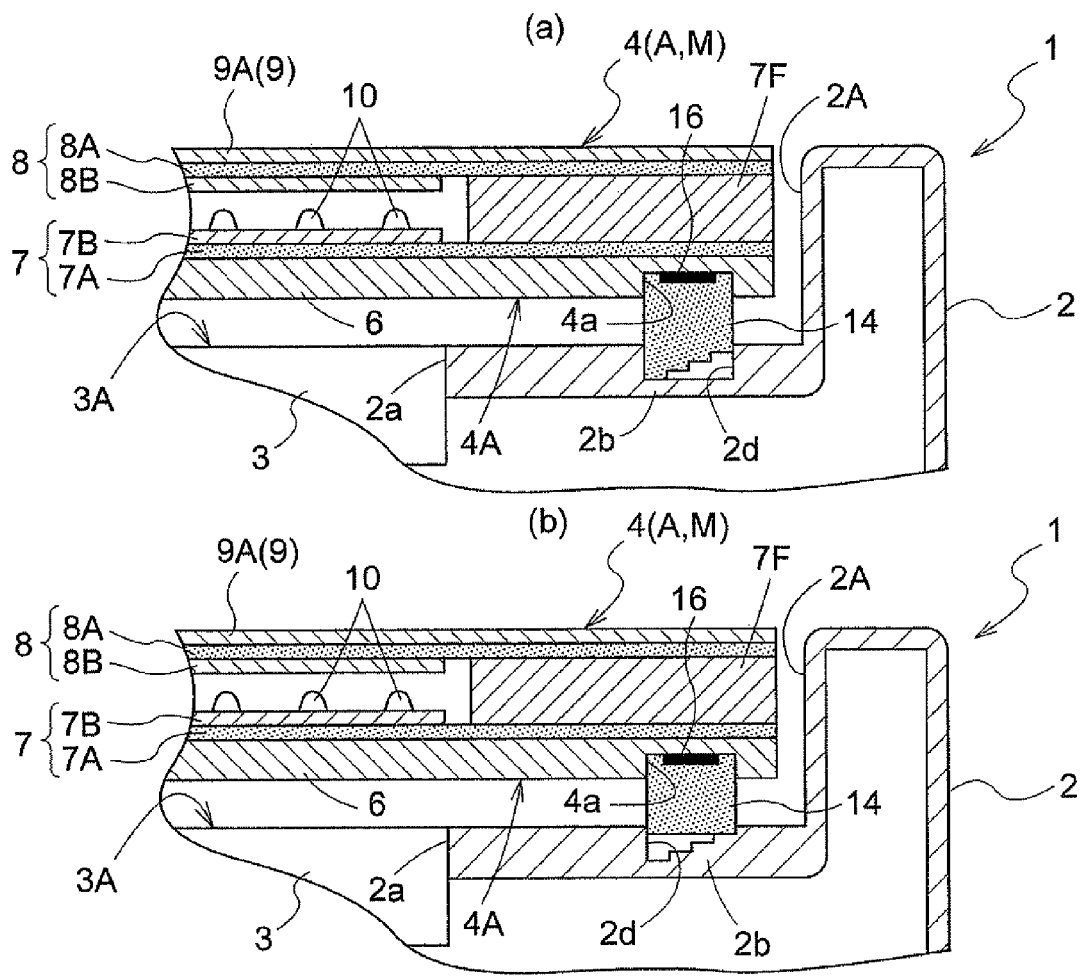
[FIG. 16] a cross sectional view of principal portions showing the construction of an electronic apparatus with a protective panel according to a fifth embodiment.
Figure 17:
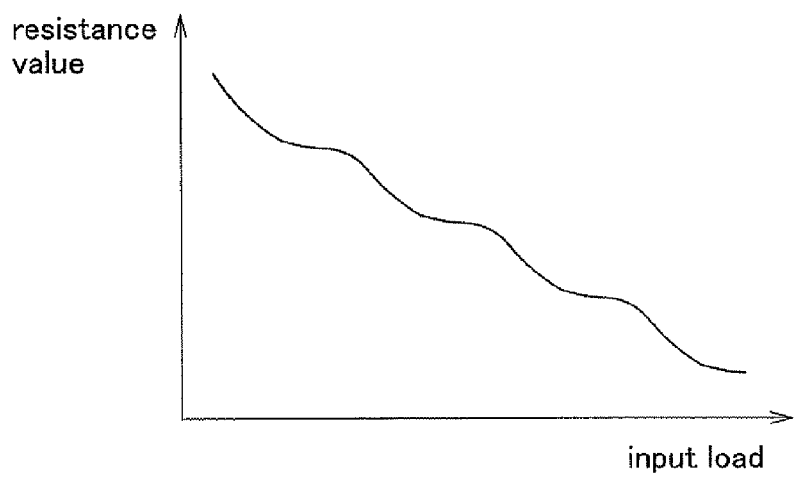
[FIG. 17] a view showing the F-R characteristics of the pressure-sensitive conductive rubber.
Figures 21, 22:
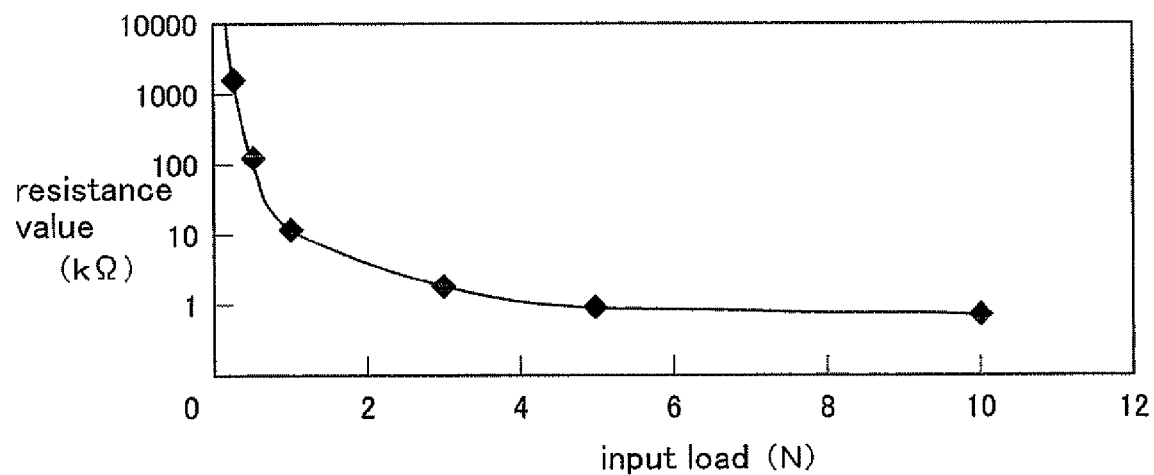
[FIG. 21] a view showing the F-R characteristics of the pressure-sensitive conductive rubber.
[FIG. 22] a view showing water-proof performances of pressure-sensitive conductive rubbers.
Figure 23:
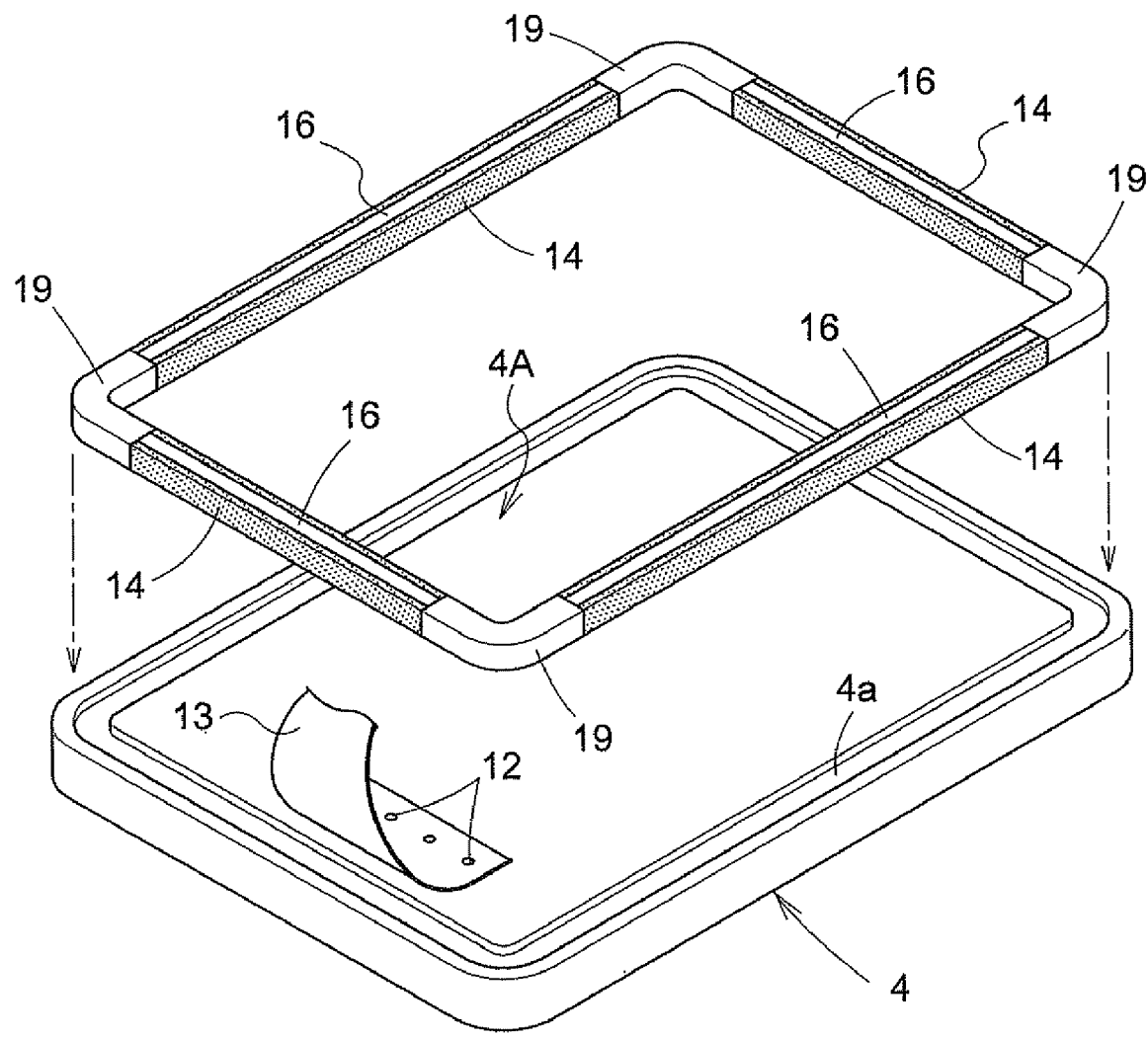
[FIG. 23] a view showing arrangement of a pressure-sensitive conductive rubber relative to a protecting panel according to a further embodiment.

DESCRIPTION OF REFERENCE MARKS 2 enclosure
2A display window
2b support portion
2d groove
3 display device
3A display section
4 protective panel
4a groove
14 pressure-sensitive conductive rubber
16 electrode
18 connector
20 control unit
A touch panel
M movable portion

The invention claimed is:

1. An electronic apparatus with a protective panel, comprising:
   a display device having a display section;
   an enclosure having a display window which is open in one direction and mounts therein said display device so as to expose said display section to the outside;
   a protective panel disposed at said display window so as to cover said display section from the outside; and
   a pressure-sensitive conductive rubber interposed between a movable portion, including at least said protective panel, and a frame-like support portion defined by a surface of said enclosure within said display window, wherein the conductive rubber prevents intrusion of foreign substance to the interior of said enclosure through said display window, and said rubber detects a depressing operation on said movable portion.

2. The electronic apparatus with a protective panel according to claim 1, wherein the movable portion includes both said protective panel and said display device.

3. The electronic apparatus with a protective panel according to claim 1, wherein the distance between the movable portion and the support portion where the pressure-sensitive conductive rubber is interposed, decreases in response to an increase in the magnitude of a depressing force by the depressing operation.

4. The electronic apparatus with a protective panel according to claim 1, wherein the distance between the movable portion and the support portion where the pressure-sensitive conductive rubber is interposed, increases in response to an increase in the magnitude of a depressing force by the depressing operation.

5. The electronic apparatus with a protective panel according to claim 1, wherein the pressure-sensitive conductive rubber is configured such that a cross-sectional area thereof normal to an applying direction of the depressing force by the depressing operation varies continuously along the applying direction of the depressing force.

6. The electronic apparatus with a protective panel according to claim 1, wherein the pressure-sensitive conductive rubber is configured such that a cross-sectional area thereof normal to an applying direction of the depressing force by the depressing operation varies stepwise along the applying direction of the depressing force.

7. The electronic apparatus according to claim 1, wherein one of the movable portion or the support portion which comes into contact with the pressure-sensitive conductive rubber is configured such that a cross-sectional area thereof normal to an applying direction of the depressing force by the depressing operation varies continuously along the applying direction of the depressing force.

8. The electronic apparatus according to claim 1, wherein one of the movable portion or the support portion which comes into contact with the pressure-sensitive conductive rubber is configured such that a cross-sectional area thereof normal to an applying direction of the depressing force by the depressing operation varies stepwise along the applying direction of the depressing force.

9. The electronic apparatus with a protective panel according to claim 1, wherein at a portion of the protective panel to be subjected to a depressing force of a depressing operation, there is provided a reinforcing structure member for enhancing the rigidity of the protective panel.

10. The electronic apparatus with a protective panel according to claim 1, wherein the pressure-sensitive conductive rubber is formed like a loop along the support portion.

11. The electronic apparatus with a protective panel according to claim 1, wherein the pressure-sensitive conductive rubber includes a connector extending from an inner wall of the rubber toward the interior of the enclosure.

12. The electronic apparatus with a protective panel according to claim 1, wherein on one face of the pressure-sensitive conductive rubber, there is mounted a pair of comb-tooth-like electrodes, via which a depressing operation to the movable portion is detected.

13. The electronic apparatus with a protective panel according to claim 1, wherein at least one of the movable portion and the support portion defines a groove for receiving the pressure-sensitive conductive rubber therein.

14. The electronic apparatus with a protective panel according to claim 1, wherein said protective panel is configured to provide functions as a touch panel.

* * * * *

UNITED STATES PATENT AND TRADEMARK OFFICE
CERTIFICATE OF CORRECTION

PATENT NO. : 7,920,225 B2  Page 1 of 1
APPLICATION NO. : 12/278651
DATED : April 5, 2011
INVENTOR(S) : Kazuhiro Nishikawa It is certified that error appears in the above-identified patent and that said Letters Patent is hereby corrected as shown below:

On the title page
In the Abstract, line 5, "section 5A" should read -- section 3A --

Signed and Sealed this
Sixth Day of September, 2011

David J. Kappos
*Director of the United States Patent and Trademark Office*